(12) United States Patent
Bolbenes et al.

(10) Patent No.: US 12,417,104 B2
(45) Date of Patent: Sep. 16, 2025

(54) SWITCHING A PREDICTED BRANCH TYPE FOLLOWING A MISPREDICTION OF A NUMBER OF LOOP ITERATIONS

(71) Applicant: Arm Limited, Cambridge (GB)

(72) Inventors: Guillaume Bolbenes, Vallauris (FR); Thibaut Elie Lanois, Peymeinade (FR); Houdhaifa Bouzguarrou, Austin, TX (US)

(73) Assignee: Arm Limited, Cambridge (GB)

( * ) Notice: Subject to any disclaimer, the term of this patent is extended or adjusted under 35 U.S.C. 154(b) by 24 days.

(21) Appl. No.: 18/588,615

(22) Filed: Feb. 27, 2024

(65) Prior Publication Data
US 2025/0272104 A1    Aug. 28, 2025

(51) Int. Cl.
*G06F 9/38* (2018.01)
*G06F 9/30* (2018.01)

(52) U.S. Cl.
CPC ........ *G06F 9/3848* (2013.01); *G06F 9/30072* (2013.01); *G06F 9/3844* (2013.01); *G06F 9/38585* (2023.08)

(58) Field of Classification Search
CPC ............. G06F 9/38585; G06F 9/30185; G06F 9/30065; G06F 9/3844; G06F 9/30072; G06F 9/3848
See application file for complete search history.

(56) References Cited

U.S. PATENT DOCUMENTS

| | | | | |
|---|---|---|---|---|
| 5,740,419 A | * | 4/1998 | Potter | G06F 9/3863 712/E9.05 |
| 5,898,865 A | * | 4/1999 | Mahalingaiah | G06F 9/381 712/E9.058 |
| 5,909,573 A | * | 6/1999 | Sheaffer | G06F 9/3806 712/240 |
| 10,275,249 B1 | * | 4/2019 | Richins | G06F 9/325 |
| 11,467,960 B1 | * | 10/2022 | Dimond | G06F 11/3037 |
| 11,693,666 B2 | | 7/2023 | Pusdesris | |

(Continued)

*Primary Examiner* — Keith E Vicary
(74) *Attorney, Agent, or Firm* — NIXON & VANDERHYE P.C.

(57) ABSTRACT

When a predicted branch type for a given address is a first branch type corresponding to a predicated-loop instruction for triggering processing circuitry to perform a variable number of iterations of a predicated loop body, branch prediction circuitry generates a first type of branch prediction indicative of a predicted number of iterations for the predicated-loop instruction, and omits speculatively updating history information based on the predicted number of iterations. The processing circuitry is able to tolerate at least one unnecessary iteration of the predicated loop body being processed when the predicted number of iterations is too large. For a second branch type, the branch prediction circuitry generates a second type of branch prediction and, at least when a taken branch is predicted in the second type of branch prediction, speculatively updates the history information. Following detection of a misprediction of the predicted number of iterations indicated by the first type of branch prediction for the given address, it is determined whether a branch type update condition is satisfied, and if so the predicted branch type associated with the given address is switched from the first branch type to the second branch type.

20 Claims, 19 Drawing Sheets

(56) References Cited

U.S. PATENT DOCUMENTS

| | | | |
|---|---|---|---|
| 11,803,390 B1* | 10/2023 | Bouzguarrou | G06F 9/30072 |
| 2004/0123075 A1* | 6/2004 | Almog | G06F 9/3844 |
| | | | 712/241 |
| 2005/0138341 A1* | 6/2005 | Maiyuran | G06F 9/325 |
| | | | 712/E9.055 |
| 2008/0005542 A1* | 1/2008 | Gschwind | G06F 9/3844 |
| | | | 712/239 |
| 2009/0172371 A1* | 7/2009 | Joao | G06F 9/3842 |
| | | | 712/240 |
| 2012/0166765 A1* | 6/2012 | Gonion | G06F 9/3838 |
| | | | 712/205 |
| 2018/0349144 A1* | 12/2018 | Pal | G06F 9/3848 |
| 2019/0213011 A1* | 7/2019 | Bhat | G06F 9/3844 |
| 2019/0310851 A1* | 10/2019 | Grocutt | G06F 9/30038 |
| 2020/0050458 A1* | 2/2020 | Bouzguarrou | G06F 9/3848 |
| 2020/0065111 A1* | 2/2020 | Bouzguarrou | G06F 9/3806 |
| 2020/0167164 A1* | 5/2020 | Jarvis | G06F 9/325 |
| 2022/0283811 A1* | 9/2022 | Al Sheikh | G06F 9/30065 |
| 2023/0120596 A1* | 4/2023 | Pusdesris | G06F 9/3861 |
| | | | 712/208 |
| 2023/0409325 A1* | 12/2023 | Bolbenes | G06F 9/30036 |
| 2023/0418611 A1 | 12/2023 | Bouzguarrou | |

* cited by examiner

SWITCHING A PREDICTED BRANCH TYPE FOLLOWING A MISPREDICTION OF A NUMBER OF LOOP ITERATIONS

BACKGROUND

Technical Field

The present technique relates to the field of branch prediction.

Technical Background

A data processing apparatus may have branch prediction circuitry for predicting outcomes of branch instructions. This can help to improve performance by allowing subsequent instructions beyond the branch to be fetched for decoding and execution before the actual outcome of the branch is determined.

SUMMARY

At least some examples of the present technique provide an apparatus comprising:
  processing circuitry to perform processing operations;
  branch prediction circuitry to determine a branch prediction associated with a given address, the branch prediction depending on a predicted branch type associated with the given address; and
  history storage circuitry to store history information indicative of a history of program flow;
  in which:
  in response to determining that the predicted branch type for the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;
  in response to determining that the predicted branch type for the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction;
  the branch prediction circuitry is configured to determine, following detection of a misprediction of the predicted number of iterations indicated by the first type of branch prediction for the given address, whether a branch type update condition is satisfied, and in response to detecting that the misprediction condition is satisfied, switch the predicted branch type associated with the given address from the first branch type to the second branch type.

At least some examples of the present technique provide a system comprising:
  the apparatus described above, implemented in at least one packaged chip;
  at least one system component; and
  a board,
  wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of an apparatus comprising:
  processing circuitry to perform processing operations;
  branch prediction circuitry to determine a branch prediction associated with a given address, the branch prediction depending on a predicted branch type associated with the given address; and
  history storage circuitry to store history information indicative of a history of program flow;
  in which:
  in response to determining that the predicted branch type for the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;
  in response to determining that the predicted branch type for the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction;
  the branch prediction circuitry is configured to determine, following detection of a misprediction of the predicted number of iterations indicated by the first type of branch prediction for the given address, whether a branch type update condition is satisfied, and in response to detecting that the misprediction condition is satisfied, switch the predicted branch type associated with the given address from the first branch type to the second branch type.

At least some examples of the present technique provide a method for branch prediction, comprising:

storing history information indicative of a history of program flow;

in response to determining that a predicted branch type for a given address is a first branch type corresponding to a predicated-loop instruction for triggering processing circuitry to perform a variable number of iterations of a predicated loop body, branch prediction circuitry generating a first type of branch prediction indicative of a predicted number of iterations for the predicated-loop instruction, and omitting speculatively updating history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;

in response to determining that the predicted branch type for the given address is a second branch type, the branch prediction circuitry generating a second type of branch prediction and, at least in response to a determination that the second type of branch prediction indicates that at least one branch corresponding to the given address is predicted to be taken, speculatively updating the history information based on a predicted outcome predicted by the second type of branch prediction; and following detection of a misprediction of the predicted number of iterations indicated by the first type of branch prediction for the given address, determining whether a branch type update condition is satisfied, and in response to detecting that the misprediction condition is satisfied, switching the predicted branch type associated with the given address from the first branch type to the second branch type.

Further aspects, features and advantages of the present technique will be apparent from the following description of examples, which is to be read in conjunction with the accompanying drawings.

DESCRIPTION OF EXAMPLES

Figure 1:
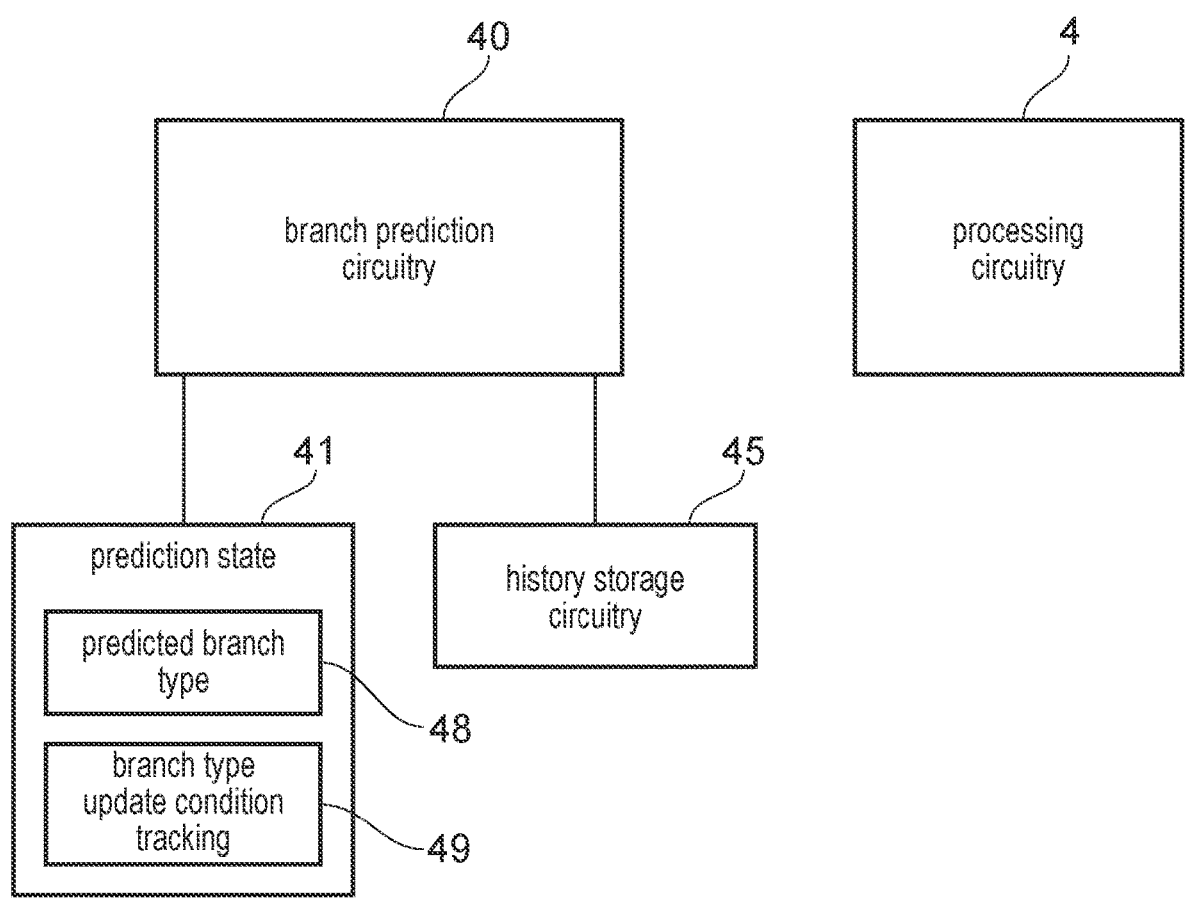
FIG. 1 illustrates an example of an apparatus having branch prediction circuitry, processing circuitry and history storage circuitry.

An apparatus comprises processing circuitry to perform processing operations; branch prediction circuitry to determine a branch prediction associated with a given address, the branch prediction depending on a predicted branch type associated with the given address; and history storage circuitry to store history information indicative of a history of program flow. One type of instruction which can behave like a branch is a predicated-loop instruction for triggering the processing circuitry to perform a variable number of iterations of a predicated loop body. To execute a given iteration of the predicated loop body, one or more micro-operations may be generated for processing by the processing circuitry. Hence, it can be useful to provide a prediction of how many iterations will be required, to allow for the corresponding number of sets of such micro-operations to be generated earlier than if waiting for the actual number of iterations to be determined. Hence, it may be useful for the branch prediction circuitry, which provide branch predictions which are used to control which instructions are fetched and decoded into micro-operations, to also be able to make predictions of the number of iterations required for a predicated-loop instruction.

Hence, the branch prediction circuitry may generate a first type of branch prediction indicative of a predicted number of iterations for the predicated-loop instruction. The branch prediction circuitry is capable of selecting the predicted number of iterations depending on the history information stored in the history storage circuitry (at least some for instances of generating the first type of branch prediction). It is not necessary to always consider the history information when making the first type of branch prediction, as in some instances if predictions are reasonably accurate with a history-independent lookup then the resources for making history-dependent predictions of the first type of branch prediction may not be needed. However, the branch prediction circuitry does provide support for history-dependent prediction of the first type of branch prediction, so that at least for harder-to-predict scenarios, the program flow history information available from the history information can be used to improve prediction accuracy compared to a history-independent prediction.

The predicated-loop instruction is an instruction for which the processing circuitry is able to tolerate at least one unnecessary iteration of the predicated loop body being processed when the predicted number of iterations is greater than an actual number of iterations required for the predicated-loop instruction. The loop body can be regarded as a "predicated" loop body because the operation (or operations) to be performed in the predicated loop body can be such that if at least one unnecessary iteration of the predicated loop body is processed following an over-estimate of the number of iterations by the branch prediction circuitry, processing of the at least one unnecessary iteration of the predicated loop body is predicated to suppress an effect of the at least one unnecessary iteration of the predicated loop body. For example, the predicated loop body could use a variable to track whether the loop should be terminated and once that variable reaches the condition in which the loop should be terminated then other operations in that predicated loop body may have their operations predicated based on that variable. For example, this could be useful if the predicated loop body uses a variable to track a number of remaining units of data to be processed and terminate the loop when no remaining units of data are to be processed, and other operations within the predicated loop body are predicated based on the number of remaining units of data to be processed, so that if the number of remaining units of data has reached zero then those other operations would in any case have their effect suppressed. It has been recognised that, unlike most other kinds of branch prediction for which any misprediction would be dealt with by flushing the incorrectly fetched/decoded operations, for such a predicated-loop instruction if an incorrect prediction of the number of loop iterations occurs but the predicted number of iterations is greater than the actual number of iterations, it is not necessary to flush the incorrectly supplied micro-operations for the iterations beyond the actual number of iterations, as often the delay of performing the flush and refetching/decoding subsequent operations may be greater than the delay associated with allowing the micro-operations for the unnecessary loop iterations to complete with predication, which is architecturally valid as the predication may prevent any changes of architectural state being caused by the unnecessarily processed loop iterations. Hence, providing a technique whereby the processing circuitry is able to tolerate some incorrect predictions of the number of iterations can improve performance by eliminating some branch misprediction flush penalties.

However, the inventors recognised that, while the technique used for the first type of branch prediction can be beneficial in many scenarios, there are some scenarios that may occur in a processing workload where the technique used in the first type of branch prediction can reduce performance. When the branch prediction circuitry makes the first type of branch prediction for the predicated-loop instruction, the branch prediction circuitry omits speculatively updating the history information stored in the history storage circuitry depending on the predicted number of iterations indicated by the first type of branch prediction. History information providing representation of history of program flow can be beneficial to improving predication accuracy for hard-to-predict branch outcomes which can take different outcomes for the same branch depending on preceding program flow history. However, it can be difficult to allow the history information to be speculatively updated based on the first type of branch prediction, in a scheme when the predicated-loop instruction is predicted in a scheme where the processing circuitry is allowed to tolerate processing of unnecessary loop iterations following an over-prediction of the number of iterations required for the instruction. With the ability to tolerate processing of unnecessary loop iterations, this would mean that the same architectural outcome (a given actual number of iterations required) may arise at the processing circuitry for two or more different predicted outcomes generated by the branch prediction. For example, if the actual number of iterations is 6, the predictions which correspond to that actual number of iterations could be 6, 7, 8, etc., without requiring any flush of incorrectly fetched/decoded micro-operations corresponding to iterations 7, 8 onwards. Hence, if one time for a given architectural behaviour (6 iterations, say) the history information is speculatively updated based on a prediction of 6 iterations, but another time for the same architectural behaviour (6 iterations) the history information speculatively updated based on the prediction of 8 iterations, the corresponding training updates to prediction state based on an instruction experiencing a particular actual behaviour may be artificially scattered across prediction entries corresponding to the different predicted numbers of iterations that could correspond to that actual number of iterations, which risks none of those entries adequately capturing the actual behaviour if there are insufficient training examples corresponding to each individual entry. This can reduce prediction accuracy for subsequent instructions which have behaviour which is correlated with the actual number of iterations. One might think that a solution to this problem could be to update the history information non-speculatively once the actual architectural behaviour has been resolved, but in practice this is not possible in cases where there is no flush of instructions. Therefore, for the first type of branch prediction, to allow toleration of over-predictions without flushing, it can be most efficient to omit speculative updates of the history information based on the predicted number of iterations indicated by the first type of branch prediction.

However, omitting the speculative update of the history information for the first type of branch prediction means that the history information may become independent of the actual outcome of the predicated-loop instruction, and merely depends on outcomes of surrounding branches. In many scenarios, this can be acceptable and the predicted number of iterations for the predicated-loop instruction may be predicted with reasonable accuracy based on the history information maintained speculatively based on other branches. However, this approach means that, in scenarios where different numbers of loop iterations occur for the same predicated-loop instruction on different instances of executing that instruction, and the program flow history updated based on outcomes of other surrounding branches is the same for each of those instances, it would be very difficult to correctly predict the number of loop iterations for that predicated-loop instruction accurately, and this may risk frequent under-prediction of the number of loop iterations, which may require flushing of instructions to resolve the misprediction, and hence provide a significant performance penalty for workloads where those scenarios arise frequently.

Hence, in the examples discussed below, the branch prediction circuitry determines, following a misprediction of the predicted number of iterations indicated by the first type of branch prediction for the given address, whether a branch type update condition is satisfied. If the branch type update is satisfied, the branch prediction circuitry switches the predicted branch type associated with the given address from the first branch type to a second branch type. The second branch type is a type of branch for which, when a given address is predicted to correspond to the second branch type, the branch prediction circuitry generates a second type of branch prediction for which, at least when the second type of branch prediction indicates that at least one branch corresponding to the given address is predicted to be taken, the history information is speculatively updated based on a predicted outcome predicted by the second type of branch prediction. Hence, by switching to a different predicted branch type, subsequent predictions for the given address involve speculative updates to the history information, and so this allows better prediction accuracy for branches (e.g. the predicated-loop instruction at the given instruction itself, and/or other branch instructions) whose outcome is correlated with the outcome of the predicated-loop instruction at the given address but is hard to predict based on program flow history of surrounding branch instructions alone. By selecting the second branch type in cases where the branch type update condition is satisfied following detection of misprediction based on the first type of branch prediction, performance can be improved in the scenarios which are hard to predict accurately based on the technique used for generating the first type of branch prediction. Nevertheless, by giving an opportunity for the first type of branch prediction to be used in cases where no misprediction is detected based on the first type of branch prediction or in which the branch type update condition is not satisfied, this can improve performance compared to implementations which always use the second type of branch prediction to predict outcomes of predicated-loop instructions, as the tolerance of over-predictions available in the first type of branch prediction scheme can help avoid some unnecessary flushes of a processing pipeline.

For the second type of branch prediction, the processing circuitry is unable to tolerate incorrect prediction of an outcome of an instruction corresponding to the given address. Hence, when the second type of branch prediction is made for the predicated-loop instruction at the given address, even if executing an unnecessary iteration of the predicated loop body would not change the architectural state, the unnecessary iteration may nevertheless not be tolerated (e.g. a flush unnecessary a event may be triggered when an unnecessary iteration of the one or more micro-operations corresponding to the predicated loop body has been supplied for processing by the processing circuitry). By suppressing toleration of incorrect predictions of the number of iterations when the second type of branch prediction is made, this prevents there being a many-to-one relationship between valid predictions of the number of iterations and the actual number of loop iterations, so that history-dependent predictions can be more reliable as they can be made based on a consistent value of history information to represent a given sequence of actual program flow behaviour. By enabling speculative update of the history information at the branch prediction stage depending on the second type of branch prediction made for a predicated-loop instruction at the given address, this type of prediction can be more suited in scenarios where program flow history information dependent on the actual number of iterations for the predicated-loop instruction is useful for more accurately predicting outcomes of the predicated-loop instruction itself or for subsequent branches. By enabling more accurate predictions, processing performance can be improved.

In response to resolution of the second type of branch prediction, the processing circuitry may commit or reverse a speculative update of the history information made based on the predicted outcome predicted by the second type of branch prediction. If the second type of branch prediction is correct, the speculative update can be committed (e.g. a commit pointer tracking the location in the history information corresponding to the youngest committed point of program flow can be updated). If the second type of branch prediction is incorrect, the speculative update can be reversed (e.g. speculative values of the history information can be discarded, or the commit pointer can be restored to a previous value).

Note that resolution of the branch prediction for a predicated-loop instruction does not necessarily require the processing circuitry to actually determine the actual number of iterations for the predicated-loop instruction (although determination of the actual number of iterations could also be a feasible option). For some implementations, it might be that the processing circuitry actually receives micro-operations separately for each individual iteration, so when processing any given micro-operation for a predicated-loop instruction, the processing circuitry might merely resolve whether an implicit branch to the predicated-loop instruction should be taken or not-taken to determine whether at least one further iteration of the predicated loop body is required (rather than explicitly evaluating the required total number of loop iterations). This individual taken/not-taken decision (together with an indication of how many loop iterations have been processed so far) can be sufficient to determine whether the predicted number of iterations was correct, e.g. based on whether the taken/not-taken decision for the current iteration would be consistent or inconsistent with the predicted number of iterations when considering which iteration is the current iteration. For example, a decision that a branch-to-self for the predicated-loop instruction should be taken on iteration X (so that iteration X is not the final iteration) would be inconsistent with a determination that the predicted number of iterations was less than X, as this would mean the branch prediction circuitry under-predicted the required number of iterations.

The processing circuitry may determine, based on branch prediction type information associated with a predicated-loop micro-operation decoded from the predicated-loop instruction at the given address, whether the branch prediction circuitry generated the first type of branch prediction or the second type of branch prediction for the predicated-loop instruction, and select between a first type of branch prediction resolution mechanism and a second type of branch prediction resolution mechanism depending on the branch prediction type information. Hence, as the same type of instruction can be predicted either by the first type of branch prediction or the second type of branch prediction, some branch prediction type information can be passed to the processing circuitry together with a given predicated-loop micro-operation, to indicate which type of branch prediction was used to control generation of that predicated-loop micro-operation. The processing circuitry can use the branch prediction type information to control various aspects of branch prediction resolution, such as whether or not the processing circuitry can tolerate over-prediction of the predicted number of loop iterations, and whether any action should be taken to commit or reverse speculative updates of history information.

For example, the first branch prediction resolution mechanism may be selected in response to the branch prediction type information indicating that the branch prediction circuitry generated the first type of branch prediction for the predicated-loop instruction. When the first branch prediction resolution mechanism is selected, the processing circuitry may tolerate at least one unnecessary iteration of the predicated loop body being processed when the predicted number of iterations is greater than an actual number of iterations required for the predicated-loop instruction. When the first branch prediction resolution mechanism is selected, there is no need for the processing circuitry, when responding to resolution of the correct outcome for the predicated-loop micro-operation, to commit or reverse any speculative update to the history information, since the corresponding first type of branch prediction would not have caused any such speculative update to the history information.

The second branch prediction resolution mechanism may be selected in response to the branch prediction type information indicating that the branch prediction circuitry generated the second type of branch prediction for the predicated-loop instruction. When the second branch prediction resolution mechanism is selected, the processing circuitry may not tolerate at least one unnecessary iteration of the predicated loop body being processed when the predicted number of iterations is greater than an actual number of iterations required for the predicated-loop instruction (e.g. if there is any difference between the predicted number of iterations and the actual number of iterations, a flush event may be triggered to cause incorrectly supplied micro-operations for the unnecessary loop iteration(s) to be flushed). When the second branch prediction resolution mechanism is selected, the processing circuitry may commit or reverse a speculative update to the history information made in response to the second type of branch prediction, to either confirm that the speculative update is correct or reverse the previous incorrect update to the history information.

The branch type update condition can be evaluated in a number of ways.

In some examples, the branch prediction circuitry is configured to determine that the branch type update condition is satisfied in response to determining that a chance-dependent test, evaluated in response to detection of the misprediction of the predicted number of iterations indicated by the first type of branch prediction for the given address, provides a first outcome, where the chance-dependent test has a given probability of providing the first outcome. With such an approach, when at least some classes of misprediction of the predicted number of iterations occurs based on the first type of branch prediction for a given address, then the chance-dependent test is evaluated, and whether or not the branch type update condition is satisfied depends to some extent on chance, by applying a test which has a given probability (e.g. where a the given probability is greater than 0 and less than 1) of providing a given first outcome. There can be a variety of techniques for implementing the chance-dependent test. For example, a test value could be obtained, e.g. by generating a random or pseudorandom number (e.g. using a linear feedback shift register, e.g. a global misprediction counter advanced per misprediction which may be shared between all addresses rather than being specific to a particular address), or by sampling bit values of a predetermined combination of signals/bits available in a processor (e.g. bits on a given bus signal path, the contents of a certain group of bits in storage locations such as registers, etc.), which may have a relatively uniform probability distribution regarding whether the sampled value takes particular numeric values, so that the particular value of the test value at a given time may be essentially random. Hence, by obtaining the test value at the time of detecting a misprediction based on the first type of branch prediction, determining whether the test value has a given value corresponding to the first outcome, and determining that the branch type update condition is satisfied, this can provide a certain probability of the given address being demoted from the first branch type to the second branch type in response to a given misprediction. Addresses for which such mispredictions based on the first type of branch prediction occur more frequently have more "rolls of the dice" at the chance-dependent test giving the first outcome, so are more likely to have their branch type switched to the second branch type than for addresses for which such mispredictions are less frequent. This approach can provide a relatively circuit-area-efficient technique for implementing an approach to detect which addresses are most likely to benefit from switching the branch type to the second branch type.

In some examples, the branch prediction circuitry may determine that the branch type update condition is satisfied in response to detecting that a misprediction counter for the given address has reached or exceeded a threshold value. A counter can be relatively simple to implement and provide circuitry for tracking the relative frequency of mispredictions for predicated-loop instructions at the given address when predicted using the first type of branch prediction. The counter could be stored in a structure looked up based on the given address, so that separate counters can be maintained to evaluate the branch type update condition separately for different address. The structure providing the counter could be a history-independent structure looked up depending on address but independent of the history information, or a history-dependent structure looked up based on address and history information.

In some examples, any misprediction of the predicted number of iterations indicated by the first type of branch prediction may cause the branch type update condition to be evaluated, to determine whether or not to trigger the switch of the predicted branch type for the given address from the first branch type to the second branch type.

However, in some examples, mispredictions of the predicted number of iterations indicated by the first type of branch prediction may not always cause the branch type update condition to be evaluated. For example, in some examples, only mispredictions arising in a particular scenario for the first type of branch prediction may cause the branch type update condition to be evaluated for determining whether to trigger the switch of branch type. For example, there may be two or more distinct sets of prediction state information available for generating the first type of branch prediction, and whether or not the branch type update condition is evaluated may depend on which set of prediction state information was used to form the first type of branch prediction. For example, the sets of prediction state information may include history-independent prediction information looked up independent of the history information and history-dependent prediction information looked up depending on the history information, so if the current first type of branch prediction was based on the history-independent prediction information, it may be preferable to try switching to using history-dependent prediction information to generate the first type of branch prediction for future predictions for the given address, rather than switch the predicted branch type to the second branch type yet. Also, the history-dependent prediction information may include more than one set of prediction information looked up based on different lengths of history information, so if the misprediction is based on a set of prediction information looked up based on a shorter length of history information, it may be preferable not to evaluate the branch type update condition yet, and instead first try predictions based on a longer length of history information.

Hence, in one example, the branch prediction circuitry may generate the first type of branch prediction depending on a lookup of a history-dependent data structure based on the given address and the history information. The history-dependent data structure comprises a plurality of tables of branch prediction state looked up based on different lengths of history information from the history storage circuitry. In response to detecting misprediction of the predicted number of iterations indicated by the first type of branch prediction when the first type of branch prediction was made based on an entry in a longest-history table of branch prediction state that, among the plurality of tables, is looked up based on a longest sequence of history information from the history storage circuitry, the branch prediction circuitry may determine whether the branch type update condition is satisfied and, in response to determining that the branch type update condition is satisfied, switch the predicted branch type associated with the given address from the first branch type to the second branch type This recognises that, if mispredictions still continue to occur even once the longest-history table of branch prediction state is used to generate the first type of branch prediction for the predicated-loop instruction, then this is an indication that the problem is not that insufficient length of history is being considered (as could be the case for mispredictions occurring when history-independent prediction information or shorter-history tables of the history-dependent data structure are used to generate the first type of branch prediction), and so this can be a hint that the mispredictions may instead be due to the first type of branch prediction not triggering a speculative update to the program flow history. Hence, by triggering the branch type update associated with the branch type update condition being satisfied specifically in cases when a misprediction is based on an entry from the longest-history table, this can better pinpoint the cases when performance may be more likely to benefit from switching the predicted branch type for the given address from the first branch type to the second branch type. In cases where the misprediction of the number of loop iterations is based on an entry from the longest-history table, a further condition may be applied for evaluating the branch type update condition, such as whether or not the chance-dependent test mentioned above provides the first outcome, or whether or not a misprediction counter for counting mispredictions as mentioned above has reached or exceeded a threshold value.

The second branch type can be any branch type which allows a prediction of architectural behaviour of the predicated-loop instruction to be generated, and for which the corresponding second type of branch prediction supports speculative updates to the history information based on the outcome predicted by the second type of branch prediction.

In some examples, the second branch type can be a branch type also used for at least one other type of instruction other than the predicated-loop instruction.

For example, the second branch type can be a branch type used for conditional branch instructions which are not predicated-loop instructions. Hence, in response to an indication that a branch to a given branch target address has been taken by the processing circuitry in response to a conditional branch instruction detected as corresponding to the given address, the branch prediction circuitry may set the predicted branch type associated with the given address to be the second branch type. This approach may be counter-intuitive, as one might expect that having initially set the predicted branch type for the given address to the first branch type corresponding to a predicated-loop instruction identified for the given address, then switching the predicted branch type to the second branch type would appear to be incorrect as the instruction at the given address would not itself have changed from the predicated-loop instruction to the conditional branch instruction. However, in practice, it is recognised that for predicated-loop instructions, it would be possible to treat that instruction as a series of conditional branches to itself, with each loop iteration being treated as terminating with a conditional branch which if taken branches back to the same address of the predicated-loop instruction itself. Therefore, it would be possible to simulate a prediction of the number of loop iterations for the predicated-loop instructions as a series of predictions of taken/not-taken outcomes for the conditional branches in each individual loop iteration. The speculative updates of history information based on these taken/not-taken outcomes can be used as input information for looking up prediction state for predicting taken/not-taken outcomes for subsequent loop iterations, so that this provides a means of more accurately finding specific predictions for the point at which the loop terminates compared to cases where the history information does not reflect the behaviour of the predicated-loop instruction at all. Hence, by switching the predicted branch type for the given address to the conditional branch type when the branch type update condition evaluation has determined there has been sufficiently frequent mispredictions for the given address when predicted as the first (predicated-loop instruction) branch type, this can help improve performance for the hard-to-predict cases of predicated-loop instructions as described earlier. Also, this approach can be relatively simple to implement in hardware, as existing branch prediction and branch resolution mechanisms for handling conditional branches can be reused for predicated-loop instructions.

Hence, in some examples, the second type of branch prediction may indicate branch outcome information indicative of whether a taken branch is predicted to occur at the given address, and at least when the branch is to be taken, a predicted branch target address selected based on branch target address prediction information associated with the given address. Therefore, the second type of branch prediction may not explicitly indicate the predicted number of loop iterations for a predicated-loop instruction, but a series of branch predictions of the second type may provide taken/not-taken outcomes for each iteration so that collectively those branch predictions allow the prediction of the overall behaviour for the predicated-loop instruction.

When setting the predicted branch type for the given address to the second branch type in response to the misprediction metric being determined to satisfy the predetermined condition, the branch prediction circuitry may set the branch target address prediction information corresponding to the given address to indicate the given address itself. This adapts a scheme normally used to predict outcomes of conditional branches other than predicated-loop instructions to be usable also for predicting the taken/not-taken outcome of a given iteration of the predicated-loop instruction.

In response to a predicated-loop instruction detection signal indicating that an instruction fetched for the given address has been decoded as being the predicated-loop instruction, the branch prediction circuitry is configured to trigger a branch type update to set the predicted branch type associated with the given address to be the first branch type. For example, decoding circuitry for decoding instructions may feed back to the branch prediction circuitry, to provide a signal indicating whether an instruction at the given address has been identified as being the predicated-loop instruction. Alternatively, this feedback signal may be returned by the processing circuitry on resolving the correct outcome for a predicated-loop instruction. Either way, by providing information to the branch prediction circuitry when a predicated-loop instruction is identified, the branch prediction circuitry can update its stored prediction state to associate the given address with the first branch type so that subsequent predictions can make use of the first branch prediction scheme where over-predictions of the required number of loop iterations are tolerated.

However, the branch prediction circuitry may suppress the branch type update from being performed for the given address in response to the predicated-loop instruction detection signal, in response to a detection that the predicted branch type for the given address is currently the second branch type and branch target address prediction information corresponding to the given address indicates the given address itself. Hence, while generally the predicted branch type may be updated to the first branch type in response to the predicated-loop instruction detection signal, if at the time of the predicated-loop instruction detection signal being generated, the current predicted branch type for the corresponding address is the second branch type (e.g. the conditional branch type mentioned earlier) and branch target address prediction information indicates that the branch is predicted to branch to the given address itself, then it is likely that an earlier attempt at predicting the outcome of the predicated-loop instruction at the given address based on the first type of branch prediction already caused misprediction of the number of iterations causing the predicted branch type to already be switched to the second branch type based on the branch type update condition being satisfied. In this case, it is preferable not to switch back to the first branch type, as the second branch type is more likely to benefit performance.

Another example of the second type of branch prediction may be to treat the predicated-loop instruction as a special kind of predicated-loop instruction for which a different branch prediction scheme is used compared to normal predicated-loop instructions predicted according to the first type of branch prediction.

For example, the second type of branch prediction may indicate the predicted number of iterations for the predicated-loop instruction, and for a predicated-loop instruction for which the second type of branch prediction is generated by the branch prediction circuitry, the processing circuitry may be unable to tolerate at least one unnecessary iteration of the predicated loop body being processed when the predicted number of iterations is greater than an actual number of iterations required for the predicated-loop instruction. In response to determining that the predicted branch type for the given address is the second branch type, the branch prediction circuitry may speculatively update the history information based on the predicted number of iterations indicated by the second type of branch prediction. In response to resolution of the second type of branch prediction for a predicated-loop instruction, the processing circuitry may commit or reverse the speculative update of the history information made based on the second type of branch prediction depending on whether the predicted number of iterations indicated by the second type of branch prediction equals the actual number of iterations required for the predicated-loop instruction at the given address. This enables better performance for a predicated-loop instruction whose actual number of iterations can be predicted accurately only based on the previous outcomes for the actual number of iterations for that instruction itself, although with the tradeoff that mispredictions which over-predict by only a few loop iterations may cause a flush of the pipeline when if predicted using the first branch prediction scheme those mispredictions could have been tolerated without a flush. Compared to the approach where the second branch type is a conditional branch instruction for which a simple taken/not-taken prediction is made (rather than a predicted "length" parameter expressing the total number of loop iterations for the predicated-loop instruction), the approach of predicting an alternative type of predicated-loop instruction as the second branch type allows the overall behaviour of the predicated-loop instruction to be predicted with a single prediction lookup process rather than involving individual prediction lookup processes for each separate loop iteration, and so can help reduce power consumption at the branch prediction circuitry.

Regardless of whether the second branch type is a conditional branch instruction type or an alternative type of predicated-loop instruction, in some examples, for a predicated-loop instruction for which the first type of branch prediction is generated by the branch prediction circuitry, the branch prediction circuitry may treat the first type of branch prediction as a correct prediction when the predicted number of iterations lies in a range A to A+B, where A is the actual number of iterations and B is an integer greater than or equal to 1; and treat the first type of branch prediction as a misprediction when the predicted number of iterations lies outside the range A to A+B. Hence, the mispredictions which may trigger evaluation of whether the branch type update condition is satisfied (for determining whether to switch from the first branch type to the second branch type) may be mispredictions where the predicted number of iterations was less than A or greater than A+B. Incorrect predictions with the predicted number of iterations in the range A to A+B do not need to trigger any branch type switch from the first type of branch to the second type of branch, even if the branch type update condition (e.g. chance-dependent test giving the first outcome or a misprediction counter satisfying a threshold) would be satisfied at the current time. Again, it is noted as above that while the branch prediction circuitry may treat the first type of branch prediction as a correct prediction when the predicted number of iterations lies in a range A to A+B, this does not necessarily require the actual number of iterations A to be explicitly determined, as an equivalent outcome may be evaluated iteration by iteration based on determining whether the taken/not-taken outcome resolved for the latest iteration is consistent with what the taken/not-taken outcome should be if the predicted number of iterations was correct.

The predicated-loop instruction can be any instruction which triggers a variable number of iterations of a predicated loop body, where predication is applied so that it is possible to tolerate performance of at least one unnecessary iteration being performed.

This technique can be particularly useful where the predicated loop body comprises a set of operations to: determine a variable number of bytes to be processed in a current iteration; perform at least one processing operation based on the variable number of bytes determined for the current iteration, the at least one processing operation including at least one of a load operation and a store operation (i.e. either one or more load operations but no store operations, or one or more store operations but no load operations, or one or more load operations and one or more store operations); and update, based on the variable number of bytes, a remaining bytes parameter indicative of a remaining number of bytes to be processed. These operations could be performed in response to a single micro-operation generated in response to the predicated-loop instruction, or in response to two or more micro-operations generated in response to the predicated-loop instruction. For such a predicated loop body involving loading and/or storing of a variable number of bytes, the number of iterations for such a loop body can be particularly hard to predict because the variable number of bytes to be processed in the loop as a whole may depend on at least one operand of the first iteration of the loop, which may be extremely variable for different instances of executing the same loop because it can be common for a function comprising such a loop body to be called from a number of different locations in program flow, where each instance may use different input operands. The number of loop iterations can also vary depending on address alignment of the target address of the load/store operation. Hence, a significant number of incorrect predictions of the number of loop iterations may be expected to arise for such a loop which processes a variable number of bytes of data loaded/stored from/to memory. Also such predicated loops may be relatively frequent in a wide range of program workloads, so the cumulative performance cost of failing to adequately predict the behaviour of such predicated loops can be expensive. The technique described above can therefore significantly improve processing performance for a wide range of program workloads, because using the first type of branch prediction for such instructions can help avoid instances of pipeline flushes being triggered when the predicted number of loop iterations is incorrect (but within a certain margin greater than the actual number), and the remaining cases where the first branch prediction scheme does not work well can have their performance improved by switching to the second type of branch prediction scheme based on the evaluation of the branch type update condition.

The techniques discussed above can be particularly useful for predicated-loop instructions which implement certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a predicated loop body processing a variable number of bytes per iteration (e.g. dependent on a size specified for the loop as a whole and/or on address alignment), similar to the one discussed above. In some software applications, a relatively large fraction of processing time can be taken up by such string processing functions. As each instance of calling the string.h processing function may lead to multiple iterations of the predicated loop body being performed and each iteration of the predicated loop body may be associated with a predicated-loop instruction, and the same processing function may be called from many different locations in the program with different operands depending on the other operations performed before the function call, such software applications may be extremely prone to loss of performance caused by mispredictions of the number of iterations of micro-operations required to be processed by the processing circuitry. The techniques discussed above can help improve prediction performance for such loops, which given the relative frequency with which string.h C library functions are called can greatly improve overall performance for a given workload.

One particular example of a string.h library function for which this technique can be particularly useful is the memcpy function, which copies a variable number of bytes of data from first memory region to a second memory region. Memcpy operations are very common in some software applications, and can be slow to process as they can involve iteration of load operations to load bytes of data from memory and dependent store operations to store the loaded bytes to a different region of memory. The loop executed for the memcpy operation can be a relatively tight loop for which the penalty caused by load/store delays and branch mispredictions can be high. By using the techniques discussed above, average case performance can be improved for the memcpy operations, which can be expected to provide a reasonable performance benefit given the frequency of such operations in typical workloads. Hence, it can be particularly useful to use the techniques described above when the one or more micro-operations generated for each loop iteration comprise micro-operations to control the processing circuitry to perform a memory copy operation to copy data from a first memory region to a second memory region.

Specific examples are now explained with reference to the drawings.

FIG. 1 illustrates an example of an apparatus comprising processing circuitry 4 for performing data processing operations in response to instructions, and branch prediction circuitry 40 for determining branch predictions, for use in controlling supply of decoded instructions to the processing circuitry 4. By predicting the outcome of branch instructions before the actual outcome is known, the processing circuitry 4 can have its pipeline filled with micro-operations (decoded versions of program instructions fetched from a memory system) sooner, to avoid pipeline bubbles (empty processing cycles when there is no micro-operation awaiting processing) which would otherwise arise if fetching and decoding of instructions did not take place until it is known that such instructions definitely need to be executed. History storage circuitry 45 stores history information indicating a history of program flow. For example, the history information may be speculatively updated based on branch outcomes of taken branches predicted by the branch prediction circuitry, so that if the predictions are correct then the history information has a value depending on the particular path of program flow taken in the program. If a prediction is incorrect, one or more previous speculative updates to the history information stored by the history storage circuitry 45 may be reversed upon resolving the correct branch outcome. The branch prediction circuitry may reference the history information when looking up branch predictions for at least some types of branches. By making branch predictions depending on program flow history expressing outcomes of earlier instructions, this can allow better prediction accuracy for harder-to-predict branches whose outcome varies between different instances of executing an instruction at the same address.

As indicated in FIG. 1, the prediction state information 41 maintained by the branch prediction circuitry based on outcomes of previous branches may include an indication of a predicted branch type 48 associated with a given address, which may be used to identify which branch prediction scheme to use for predictions associated with that address. For example, there may be a number of different branch prediction schemes supported by the branch prediction circuitry for different types of branches, and the predicted branch type 48 may be updated based on feedback from the processing circuitry 4 on the type of branch instruction encountered for a given address once instructions from that address have been decoded. In some cases, the predicted branch type 48 may also depend on resolution of previous predictions, depending on whether other branch prediction schemes have encountered mispredictions justifying a switch to a different branch type. One particular scenario for switching branch type 48 for a given branch is based on branch type update condition tracking information 49 maintained by the branch prediction circuitry for use in evaluating, in response to a misprediction based on a first branch type corresponding to a predicated-loop instruction, whether to switch the predicted branch type 48 from the first branch type to a second branch type. For example, the branch type update condition tracking information 49 could be a random number generator, linear feedback shift register, or other circuit element for sampling a set of information which is used on a given misprediction based on first branch type to determine whether to switch to the second branch type. The branch type update condition tracking information 49 could also include at least one misprediction counter which counts a rate of mispredictions for a given address.

Figure 2:
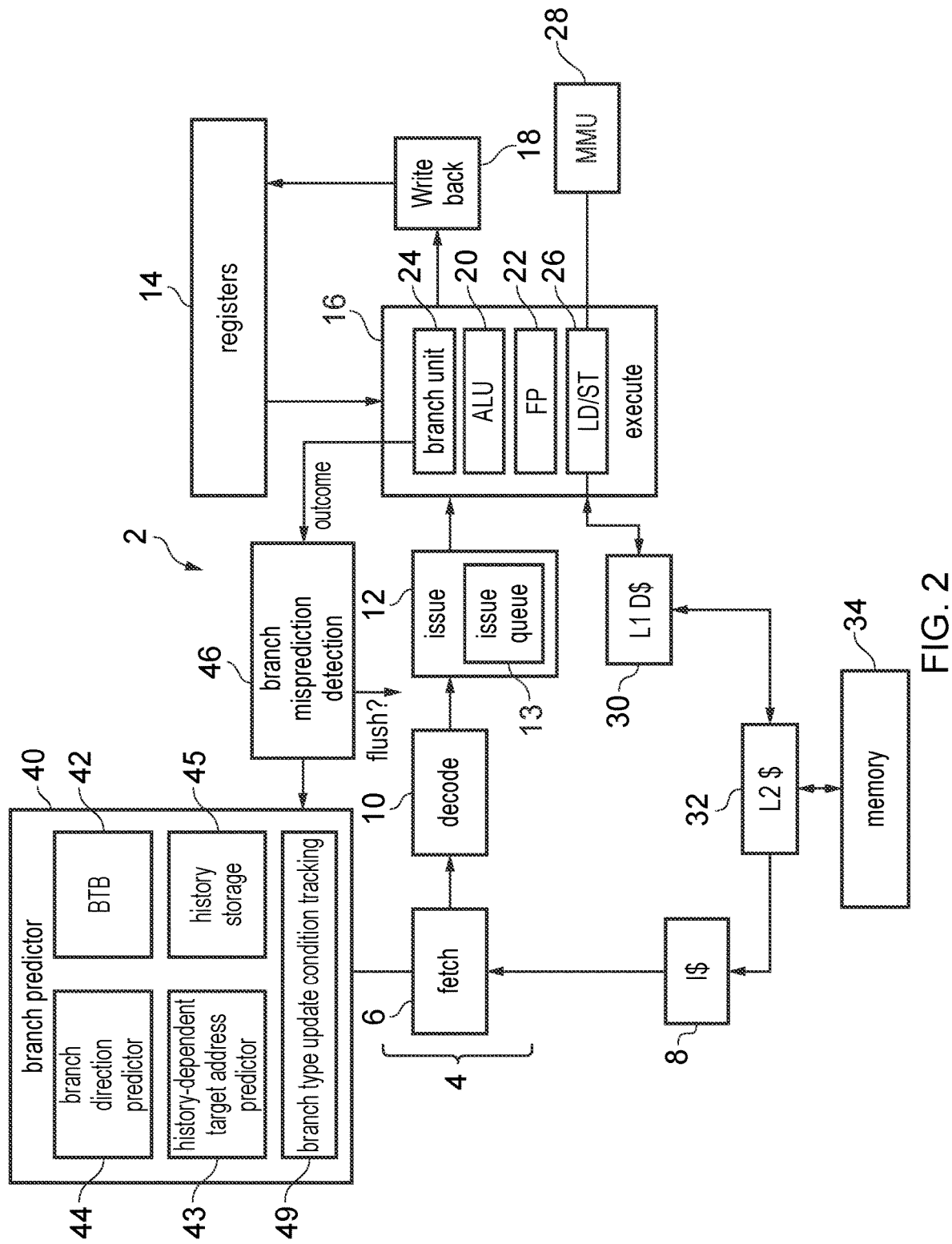
FIG. 2 illustrates a more detailed example of a processing apparatus.

FIG. 2 schematically illustrates an example of a data processing apparatus 2 in more detail. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for queueing micro-operations in an issue queue 13 and checking whether operands required for the micro-operations are available in a register file 14 and issuing micro-operations for execution once the required operands for a given micro-operation are determined to be available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included, e.g. between the decode stage 10 and issue stage 12, for mapping architectural registers specified by program instructions or micro-operations to physical register specifiers identifying physical registers in the register file 14. Also, for an out-of-order processor, the writeback stage 18 may use a reorder buffer to track completion of instructions executed out-of-order.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 2 is merely a simplified representation of some components of a possible processor pipeline architecture, and the processor may include many other elements not illustrated for conciseness. The fetch stage 6 and decode stage 10 may be considered as an example of front end circuitry for supplying micro-operations for processing by the execute stage 16. The execute stage 16 (or alternatively, the pipeline 4 as a whole) can be regarded as an example of processing circuitry for performing processing operations.

As shown in FIG. 2, the apparatus 2 includes a branch predictor 40 for predicting outcomes of branch instructions. The branch predictor is looked up based on addresses of instructions to be fetched by the fetch stage 6 and provides a prediction of whether those instructions are predicted to include branch instructions, e.g. instructions capable of causing a non-sequential change in program flow (a change of program flow other than a sequential transition from one instruction address to the immediately following instruction address in a memory address space). For any predicted branch instructions, the branch predictor 40 provides a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, a branch direction predictor (BDP) 44 for predicting the not taken/taken outcome (branch direction), a history-dependent target address predictor 43 for predicting branch target addresses for harder-to-predict branches whose target address depends on program flow history of instructions prior to the branch, and the history storage circuitry 45 which stores history information indicative of the program flow history. The branch predictor 40 can also include the branch type update condition tracking circuitry 49 mentioned earlier. It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24 of the processing circuitry 4, 16, whether a branch has been incorrectly predicted, and controls the pipeline 4 to suppress effects of the incorrectly predicted branch instruction and cause execution of instructions to resume based on the correct branch outcome (e.g. by flushing operations that are younger than the branch in program order and resuming fetching from the instruction that should be executed after the branch). The prediction state data in the BTB 42, branch direction predictor 44 and history-dependent target address predictor 43 is trained based on the outcomes of executed branch instructions detected by branch misprediction detection circuitry 46. While FIG. 2 shows the branch misprediction detection circuitry 46 as separate from the branch unit 24, execute stage 16 and branch predictor 40, in other examples the branch misprediction detection circuitry 46 could be regarded as part of the processing circuitry 4, 16 or part of the branch prediction circuitry 40.

Figure 3:
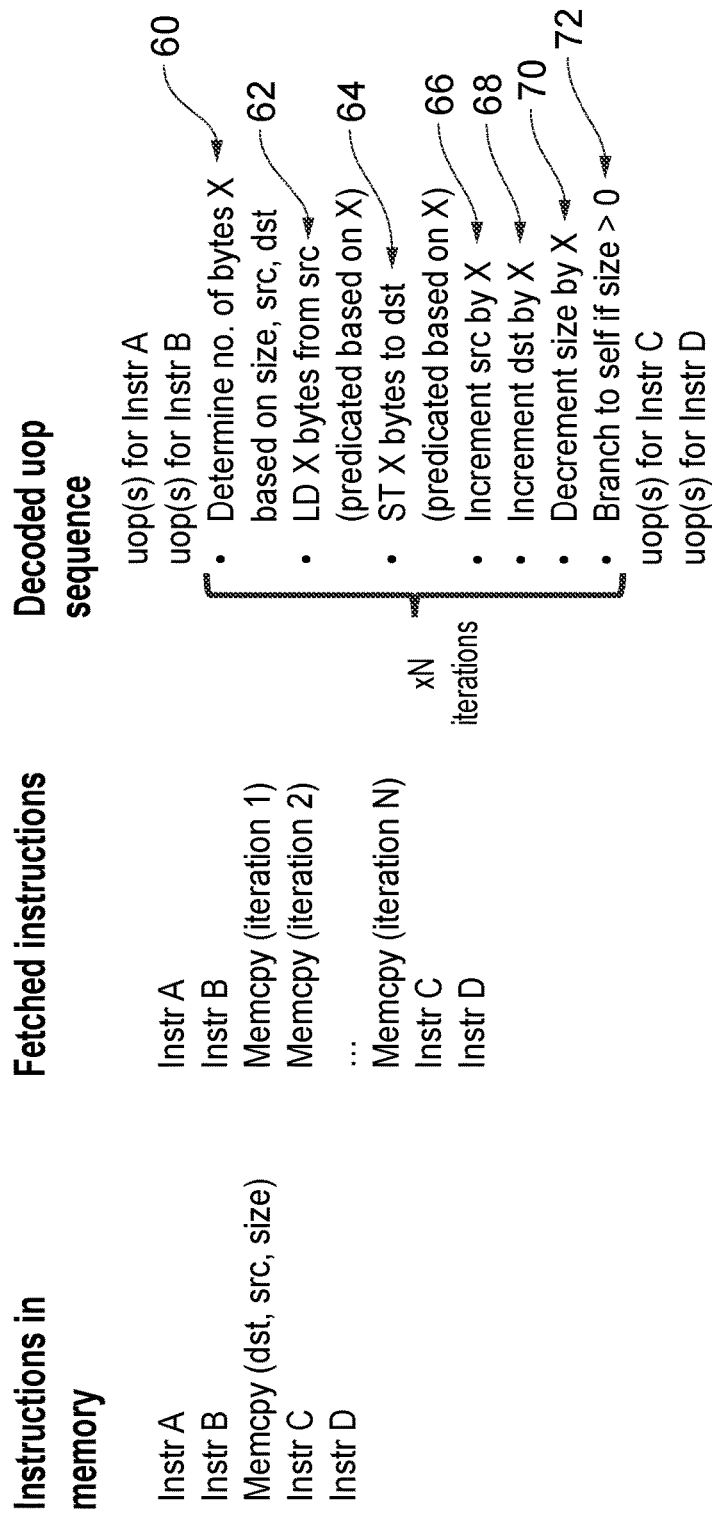
FIG. 3 illustrates an example of a predicated-loop instruction.

FIG. 3 illustrates processing of a memory copy instruction for copying data from a first memory region to a second memory region. The memory copy instruction is a particular example of a predicated-loop instruction.

The memory copy instruction specifies a source address src identifying a first region of memory and a destination address dst identifying a second region of memory, as well as specifying a size parameter which identifies the number of bytes of data to be copied from the first region of memory to the second region of memory. Any addressing mode may be used to identify the address operands (e.g. using an absolute address, or as a relative address specified using an operand defining an offset, which could be specified relative to a base address stored in a register 14 or relative to an instruction address of the memcpy instruction itself). The left-hand portion of FIG. 3 shows a sequence of program instructions as they would be stored in memory prior to being fetched by the fetch stage 6. A single instance of the memory copy instruction is included surrounded by a certain number of other instructions A, B, C, D.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 can use prediction state information stored in the BTB 42, branch direction predictor 44, or history-dependent target address predictor 43 to detect whether the loop should be terminated at a given iteration of the loop. If the number of iterations of the memory copy instruction is mispredicted, the branch misprediction detection circuitry 46 may (sometimes) trigger a flush of incorrectly scheduled micro-operations which should no longer be executed, and control the pipeline 4 to resume fetching operations from after the mispredicted branch, including fetching more instances of the memory copy instructions if required.

Hence, the middle portion of FIG. 3 shows the fetched sequence of instructions fetched by the fetch stage 6 when the program instructions stored in memory are executed. Note that, in the fetched instruction sequence as shown in the middle portion of FIG. 3, all of the instances of the memory copy instruction shown are actually different fetched instances of the same instruction fetched from the same instruction address, where the branch predictor 40 has predicted that N iterations of the loop will be needed before the loop termination condition occurs (which in this case is when the size parameter indicates that the number of remaining bytes to be processed has reached zero).

The right-hand portion of FIG. 3 illustrates a decoded sequence of micro-operations generated by the decode stage 10 corresponding to the fetched instruction sequence shown in the middle part of FIG. 3. For a given instance of fetching the memory copy instruction for a particular iteration of the memory copy loop, that instance of the memory copy instruction is mapped by the decode stage 10 to a group of multiple micro-operations 60-72 which collectively implement a single iteration of the memory copy loop. Hence, in the example shown in FIG. 3 where N iterations of the memory copy loop are required, there will be N sets of the group of micro-operations 60-72 illustrated with the bracket (FIG. 3 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 3 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment. Alternatively, in some implementations a dedicated memory copy "prologue" (CPYP) may be provided which has the job of performing a prologue iteration prior to the main-body memory copy instruction (CPYM), with the prologue iteration processing a number of bytes selected to ensure that for a subsequent iteration processed in response to the main-body memory copy instruction (CPYM) the source and/or destination address becomes an unaligned address, and in this case when the main-body memory copy instruction CPYM is executed, it may not always be necessary to consider address alignment when choosing how many bytes to process per iteration.

Figure 4:
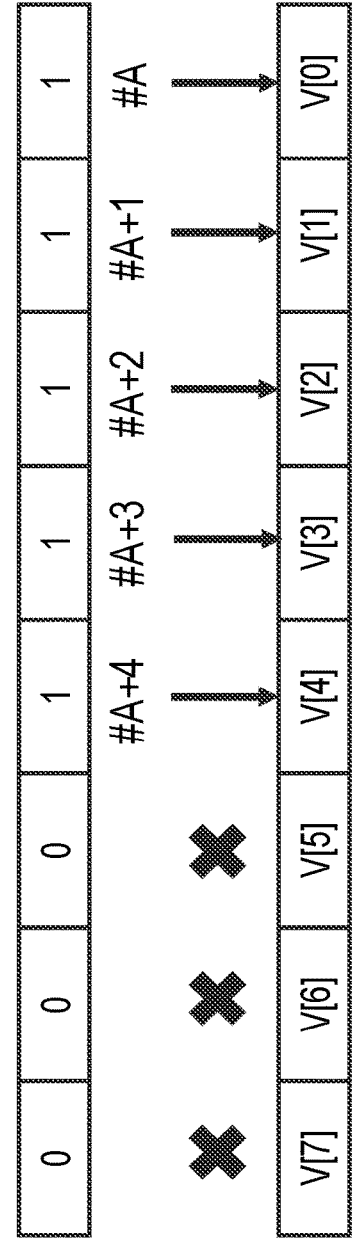
FIG. 4 illustrates use of predication for the predicated-loop instruction.

Also, the micro-operations generated for a particular memory copy instruction iteration include a predicated vector load micro-operation 62 which loads a destination vector register with at least X bytes of data obtained from memory system locations identified based on the source address src. FIG. 4 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation 60 had determined that the number of bytes X to load equals 5 then the predicate could be generated as shown in FIG. 4 to indicate that 5 bytes of data should be loaded to the first five elements of the vector.

As shown in FIG. 3, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 4, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration.

The set of micro-operations for a given instance of the memory copy instruction also includes a branch micro-operation 72 which performs a conditional branch to the instruction address of the memory copy instruction itself, with the branch being taken if the size parameter after the update performed by micro-operation 70 is greater than 0 and the branch being not taken if the size parameter is 0. That is, this branch is conditional on whether the loop termination condition for the loop is satisfied. Although not shown in FIG. 3 for conciseness, in some instruction set architectures there may also be an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the determined number of bytes are copied from source region of memory to a destination region of memory and the addresses and size parameter are updated accordingly and if it is still necessary to perform a further iteration of the loop because there is at least one remaining bytes to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction. Also, it will be appreciated that there could be other ways of adjusting the source/destination addresses and the size parameter in each iteration of the loop, so the particular example of incrementing src and dst by X and decrementing size by X is just one example.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing a number of bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 3 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

Another example of a string processing function which could use a similar approach is the memset( ) function which sets each byte within a given destination region of memory to a certain predetermined value, where the number of bytes updated in the destination region of memory is determined based on a parameter of the instruction, and again an iterative approach can be used where each iteration determines a certain number of bytes X to be processed (e.g. based on the maximum size supported for the memory transaction, the number of remaining bytes, and address alignment), and then issues a predicated store predicated based on the determined number of bytes X, before updating the store address and the number of remaining bytes parameter based on the variable number of bytes X processed in that iteration, and then conditionally branching for another iteration of the loop body if there is still at least one further byte remaining to be processed. For memset( ) there would be no need for the predicated loop body to include the predicated load micro-operation 62 shown in FIG. 3.

It will be appreciated that these are only some examples of processing functions which could use the technique discussed below. Although FIG. 3 shows an example where the micro-operations for a given iteration of the predicated loop body are generated by the instruction decoder 10 in response to a single combined instruction, it would also be possible in other implementations for the operations of the predicated loop body to be defined a separate program instructions in the representation of the program code stored in memory. Also, while FIG. 3 shows an example where the instruction that controls the performance of all or part of the predicated loop body also triggers the conditional branch depending on whether the loop termination is satisfied, it would also be possible for the conditional branch on each iteration of the predicated loop body to be performed in response to a micro-operation generated in response to a separate branch instruction included in the program code stored in memory separate from the instruction implementing the predicated loop body of the memcpy or other string processing function.

Memory copy functions and other string processing functions are some of the most common library functions to be used by software applications. Applications using these functions can therefore see a significant performance improvement if processing of these functions can be accelerated. Including a dedicated program instruction in the instruction set architecture, such as the memcpy instruction shown in FIG. 3, can help to reduce the overhead of fetching instructions from the cache or memory, although this is not essential and as mentioned above it would also be possible to promote these functions using a number of separate program instructions. Nevertheless, the performance achieved for such instructions may depend on the way in which branch prediction is handled for these instructions, because the branch predictor 40 may need to predict how many iterations of the operations associated with the predicated loop body are to be fetched and issued for execution. This depends on prediction of the outcome of a predicated-loop instruction, such as the memcpy instruction shown in FIG. 3 or a separate conditional branch instruction following the instruction(s) of the predicated loop body of such a predicated loop, and that outcome may be relatively hard to predict because the point at which the loop terminates may be affected both by memory address alignment and copy data size (the total number of bytes required to be processed, as specified by the remaining bytes parameter provided for the first iteration of the loop).

Typically, the processing circuitry 16 can adjust the number of bytes X selected for copying in a given loop iteration based on load/store address alignment, because modern CPUs generally prefer to load/store data with a certain aligned address (e.g., 16-byte aligned, or aligned to some other boundary associated with a block size corresponding to a certain power-of-2 number of bytes). To force this alignment, the memcpy function in the predicated loop body can copy a small number of bytes instead of processing entire word in the first iteration, so that the address for the next iteration becomes aligned.

For example, in the case of memcpy(dst, src, 30), the number of iterations for the entire memcpy loop can vary based on the address alignment (assuming 16-byte alignment in this example):
  (a) Src=0x100
    Iter-1: Copy 16 bytes//after iter-1, src=0x110, remaining size=14
    Iter-2: Copy 14 bytes
  (b) Src=0x1fc
    Iter-1: Copy 4 bytes//after iter-1, src=0x200, remaining size=26
    Iter-2: Copy 16 bytes//after iter-2, src=0x210, remaining size=10
    Iter-3: Copy 10 bytes The application may see further divergence when input size is different (e.g. size=10 and size=100 will cause different control flow).

Therefore, the total number of iterations required can diverge significantly depending on the data-dependent inputs to the predicated loop function, which makes predicting the outcome hard for the branch prediction circuitry. As shown in FIG. 2 the branch predictor 40 may have a prediction structure (e.g. BTB 42, history-dependent target address predictor 43, or branch direction predictor 44, or a separate prediction structure), which can be used to predict whether a given iteration of the loop terminating branch within the predicated loop will terminate the loop. A number of entries may be maintained, looked up based on lookup information such as an instruction address associated with an instruction corresponding to the loop, such as the memcpy instruction shown in FIG. 3, and/or history information indicative of a history of program flow leading up to that instruction (e.g. branch history updated based on properties of a number of recent taken branches). Each entry could track, for example, the predicted number of iterations of the loop, or in other examples could correspond to a specific iteration of the loop and indicate whether the loop terminating branch on that iteration is predicated to be taken or not taken. While such predictions can help to partially reduce the number of branch mispredictions for such predicated loops, there may still be a significant number of mispredictions because the number of required iterations may vary for some loops from one instance to another based on the size and address alignment of the operands, and so the behaviour learned from a previous instance of the loop may no longer be accurate. Some techniques for reducing the latency penalty associated with such branches are discussed below.

Figure 5:
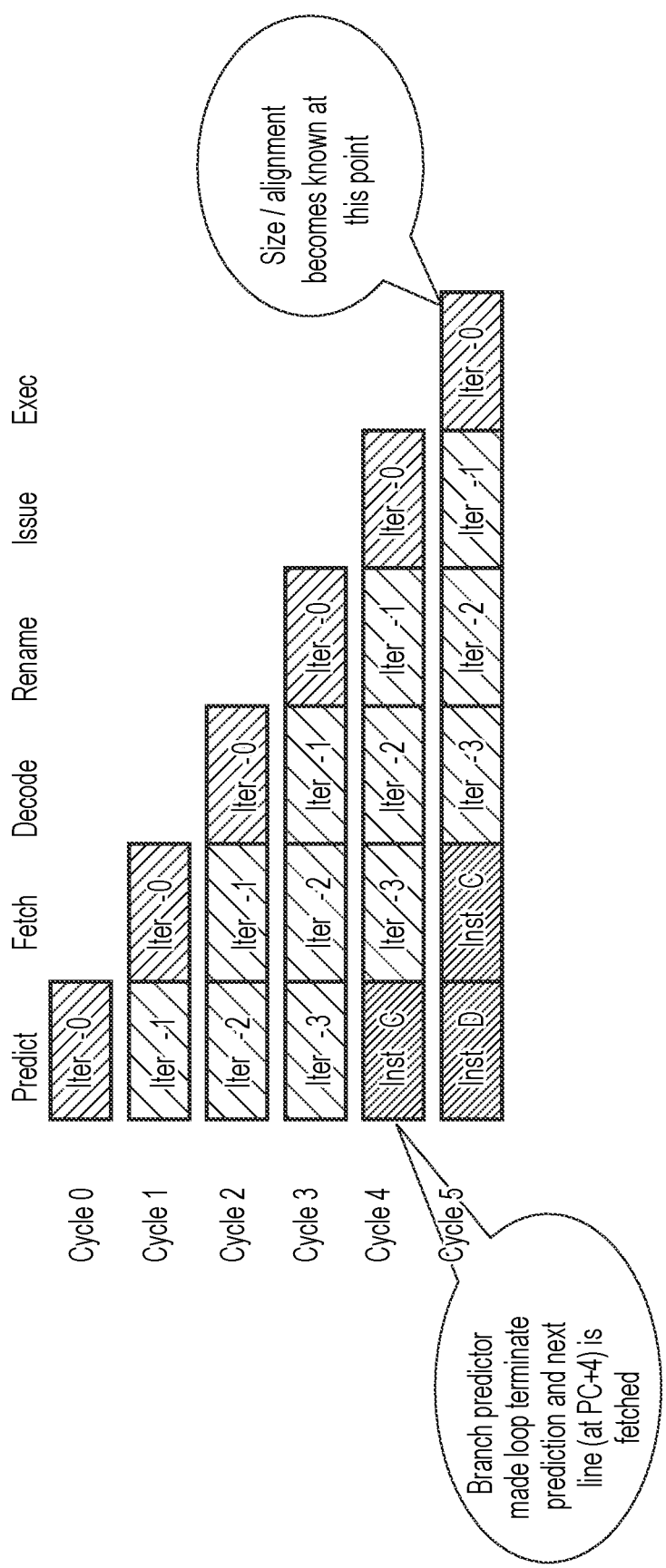
FIG. 5 is a pipeline diagram illustrating processing of a number of iterations of a predicated loop body.

FIG. 5 shows a general pipeline diagram illustrating processing of a number of iterations of the predicated loop body using a processing pipeline having a number of pipeline stages. In this example the pipeline stages include: a prediction stage (corresponding to the operation of the branch predictor 40), the fetch stage 6, the decode stage 10, a register renaming stage (not illustrated in the example of FIG. 2) at which architectural register specifiers specified by the decoded instructions are mapped (renamed) to physical register specifiers identifying registers 14 provided in hardware (other examples may omit the register renaming stage); the issue stage 12; and the execute stage 16. Of course, this is just one example of a possible set of pipeline stages.

Instructions or micro-operations associated with each iteration of the loop progress from stage to stage of the pipeline so that while the instructions or micro-operations associated with an earlier iteration are at a later stage of the pipeline, the instructions or micro-operations associated with a later iteration can be processed at an earlier stage of the pipeline. In this example, for conciseness it has been assumed that the operations performed at a given stage for a given iteration of the predicated loop can be completed in one processing cycle (even if the processing operations corresponding to that iteration are mapped to multiple micro-operations by the decode stage 10). It will be appreciated that other implementations could take more than one cycle for some stages and so the particular timings shown in FIG. 5 are just one example.

In cycle 0, the branch predictor 40 receives, as an address for which a branch prediction should be made, an address of an instruction corresponding to iteration 0 of the loop, and predicts that the loop termination condition will not be satisfied so that a further iteration, iteration 1, will be required. Similarly, the branch predictor 40 continues to predict that the loop termination condition will not be satisfied for subsequent iterations, until when predicting the outcome of iteration 3 the determination condition is predicted to be satisfied, so that the prediction is that after iteration 3 is complete, the next instruction should be instruction C which follows the loop (as instruction C is the instruction following the memcpy instruction in the example of FIG. 3). Based on these predictions the branch predictor 40 controls the fetch stage 6 to fetch the required number of iterations of the instructions corresponding to the program loop body (e.g. a single memcpy instruction per iteration in the example of FIG. 3), and the subsequent stages then carry out their respective functions of decoding, renaming (if supported) and issuing, before the decoded micro-operations reached the execute stage for iteration 0 in cycle 5 in this particular example. At the point when the micro-operations corresponding to iteration 0 reach the execute stage 16, the micro-operands for the micro-operations in iteration 0 are available, for example, the size parameter which determines the number of remaining bytes to be processed and the address for which the load/store is to be performed become known. These parameters can be used to determine whether the conditional branch for iteration 0 should have been triggered, and so at this point the branch misprediction detection circuitry 46 can determine whether the branch prediction for iteration 0 was correct.

Figure 6:
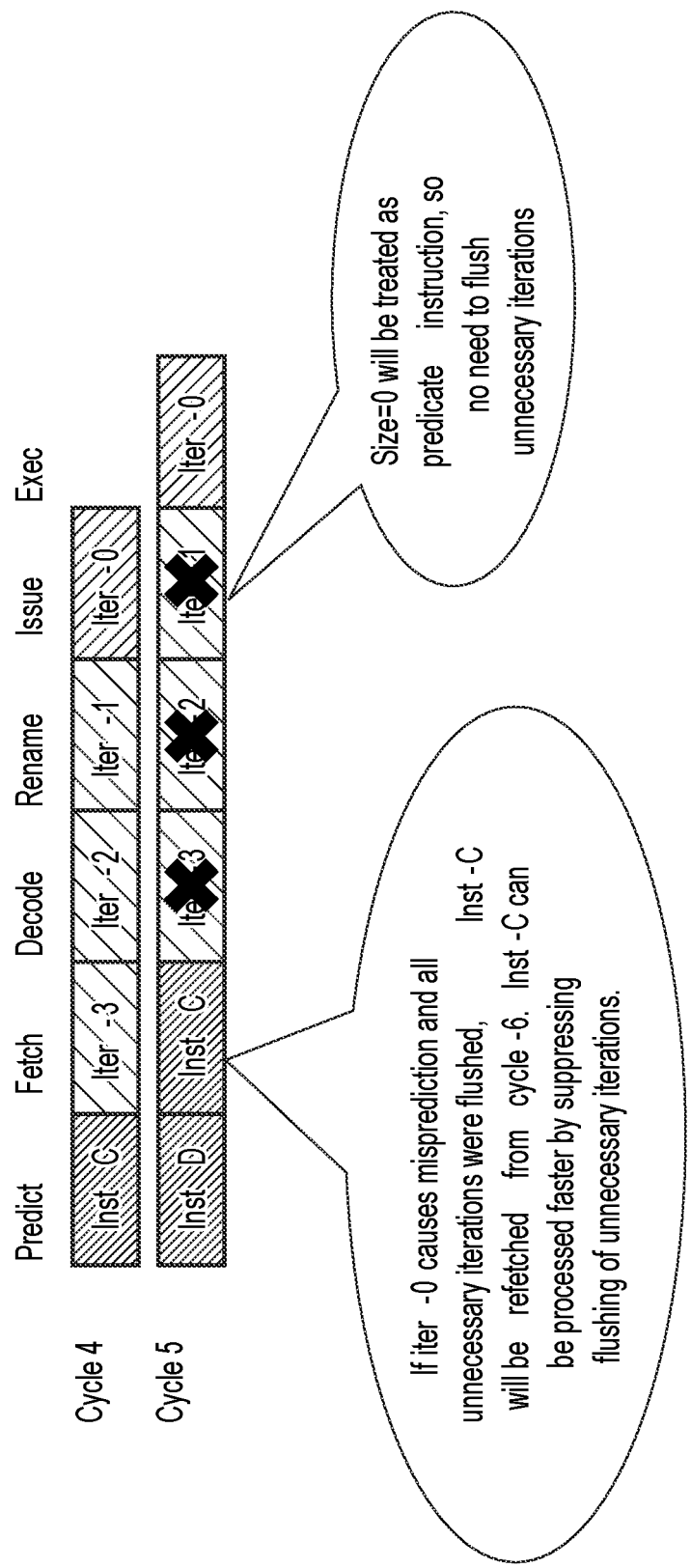
FIG. 6 is a pipeline diagram illustrating suppression of flushing of unnecessary iterations of the predicated loop body.

Normally, if it is now determined that a branch prediction was incorrect, the response taken by the branch misprediction detection circuitry 46 would be to flush the pipeline of any operations which are younger than the micro-operation for which the misprediction occurs, and so if iteration 0 is mispredicted as shown in the example of FIG. 6, one would normally expect to flush the micro-operations associated with iterations 1, 2, 3 which were unnecessary iterations which should not have been fetched. Normally, after triggering such a flush, fetching of instructions may then resume from the correct instruction which should have executed after the mispredicted branch.

However, in the example of FIG. 6, if a flush was triggered in response to the misprediction arising for iteration 0, this would flush the pipeline of all the remaining younger micro-operations after iteration 0, and re-fetching of the instructions to be processed after the branch would then commence in cycle 6 after the cycle 5 in which the branch misprediction was identified. In the example shown in FIG. 6, the correct number of loop iterations to be executed for the predicated loop should have been 1, so that the following instruction C should have been executed directly after the operations associated with iteration 0 of the predicated loop.

As shown in FIGS. 5 and 6, at the point when the branch misprediction is identified in cycle 5 when the micro-operations for iteration 0 reach the execute stage, the following instruction C may already have been fetched and be resident within the pipeline. Therefore, the following instruction C to be processed based on the correct branch prediction outcome can be processed faster by not flushing micro-operations after the mispredicted branch for iteration 0, but instead allowing the unnecessary loop iterations 1, 2, 3 to remain in the pipeline without being flushed. This is possible because the nature of the predicated loop body is such that if it is executed unnecessarily following a mispredicted-non-termination branch misprediction when the loop termination condition was predicted to be not satisfied when it should have been satisfied, then in any case the predication used for the operations within the predicated loop body means that the architectural effects of the unnecessarily executed operations will be suppressed. Using the example shown in FIG. 3, for instance, if an unnecessary loop iteration is carried out then the size parameter supplied for that iteration will be 0 (since if the correct outcome of the loop termination condition evaluation in the preceding iteration was that the loop should have terminated, this implies that the size was equal to 0 at the end of that iteration). If the size parameter is 0, then the load/store operations will be predicated to suppress the effects of the load/store (e.g. the destination register of the load will not be updated with data loaded from memory, and issuing of store requests to memory may be suppressed for the store operation when the predicate indicates that all the elements of the vector are inactive because the required number of bytes to be stored is 0). Similarly, incrementing the address parameters by X and decrementing the size by X will have no architectural effect if X=0. Therefore, it is possible to allow the micro-operations corresponding to unnecessary loop iterations fetched following a branch misprediction to remain without being flushed. By suppressing the flushing of the unnecessary iterations, the next instruction can be processed faster. In a first branch prediction scheme used for predicated-loop instructions such as those described earlier, the processing circuitry 4, 16 can tolerate processing unnecessary loop iterations such as those iterations 1, 2, 3 shown in FIG. 6, which can provide improved performance in comparison to flushing the micro-operations associated with the unnecessary loop iterations from the processing pipeline 4.

Some specific examples of the prediction structures 42, 43, 44, 45 of the branch predictor 40 are now described. It will be appreciated that other examples could implement the branch prediction structures in a different way.

Figure 7:
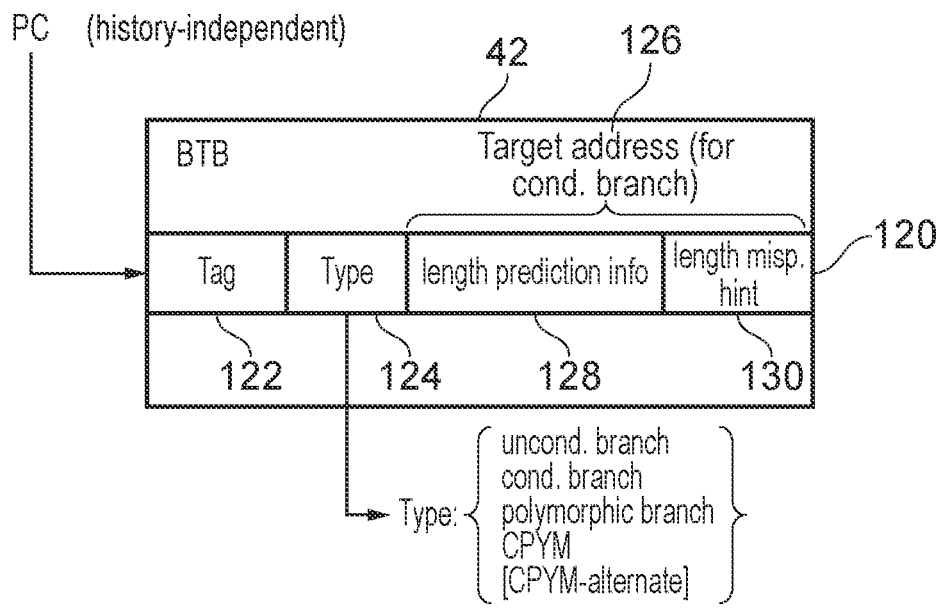
FIG. 7 illustrates an example of a history-independent data structure for providing predictions of a predicted branch type and predicted branch target address and/or predicted number of loop iterations for a predicated-loop instruction.

FIG. 7 illustrates an example of the BTB 42, which is a specific example of a history-independent branch target address predictor. The BTB 42 is implemented as a cache-like structure comprising a number of prediction entries 120 able to be allocated for respective addresses. The entries 120 are looked up based on a program counter (PC) address representing the current point in program flow for which a branch prediction is to be generated. Each prediction entry 120 specifies an address tag value 122 used on lookups to the BTB 42 to determine whether that prediction entry 120 relates to the PC address supplied for the BTB lookup. For example, a tag value generated based on a portion of the PC address or as a hash of the PC address may be compared with the tag 122 of a given subset of prediction entries (e.g. the given subset of prediction entries may comprise all of the prediction entries 120, or a limited subset of prediction entries in a set-associative approach). If one of those entries has a tag 122 matching the tag value generated from the input PC address, then a hit is detected in the BTB and a branch prediction can be generated based on contents of the prediction entry 120 (referred to as the "hit prediction entry") that had the matching tag value 122. If none of the looked up subset of prediction entries 120 has a matching tag value 122 corresponding to the input PC address then a miss is detected and the instruction at the target address is predicted to not require any taken branch, and so instruction fetching may resume sequentially beyond that PC address.

If a hit is detected in the BTB 42, then the hit prediction entry provides a number of other items of prediction state, including a predicted branch type 124 and a target address field 126 used for providing a predicted target address for conditional or unconditional branch instructions. If the predicted branch type is a predicated-loop instruction (e.g. the memory copy instruction described earlier, denoted CPYM in FIG. 7 and subsequent Figures), then as no prediction of a target address is needed for the predicated-loop instruction (since the CPYM instruction branches back to itself and the target address is therefore implicit), the target address field 126 can be reused to provide information for predicting the number of iterations of the predicated loop that will be required by the predicated-loop instruction. For example, the target address field 126 can be reused to provide length prediction information 128 and a length misprediction hint 130. The length prediction information 128 can vary from implementation to implementation, but in general may specify at least one length field specifying a predicted number of loop iterations. In some examples, multiple length predictions may be specified, with some stored prediction state information being used to select which of the alternative predictions to use (e.g. information can be stored tracking both average-case and maximum loop iterations for a given CPYM instruction, with a selection based on a confidence associated with each prediction). The length misprediction hint 130 can be a flag or counter used to track mispredictions detected by the branch misprediction detection circuitry 46 of the processing circuitry 4 when a prediction was based on the length prediction information 128 of a given entry. When the length misprediction hint 130 reaches a given threshold, subsequent predictions of the number of loop iterations for the CPYM instruction represented by the prediction entry 120 can be made depending on information stored in the history-dependent target address predictor 43 instead of using the length prediction information 128 stored in the history-independent structure provided by the BTB 42. Alternatively, the length misprediction hint 130 could be a single bit flag set upon a misprediction using the length prediction information 128 for which a given chance-dependent test gives a particular outcome (e.g. any of the examples of chance-dependent test mentioned earlier), so that for prediction entries 120 which do not have the length misprediction hint 130 set the length prediction information 128 is used for the prediction of the number of loop iterations, but for entries 120 with the length misprediction hint 130 set, the history-dependent target address predictor 43 is looked up to generate the length prediction. This enables harder-to-predict CPYM instructions, whose number of iterations vary depending on prior program flow history, to be predicted more accurately than using the length prediction information 128 which is looked up independent of the history information tracked by history storage circuitry 45.

The branch type field 124 may indicate, as the predicted branch type for a given address corresponding to the prediction entry 120, one of a set of branch types corresponding to different methods taken by the branch predictor 40 for generating the branch prediction for the given address. For example, the branch type field 124 may distinguish the following branch types:

unconditional branch: the branch is always taken, but its target address is predicted based on the target address field 126 of the corresponding prediction entry 120;

conditional branch: whether the branch is predicted taken or not-taken depends on a lookup of the branch direction predictor 44, and if taken the target address of the branch is predicted based on the address specified by the target address field 126;

polymorphic branch: whether the branch is predicted taken or not-taken depends on a lookup of the branch direction predictor 44, and if taken the target address of the branch is predicted based on a history-dependent lookup of the history-dependent branch target address predictor 43. Switching from unconditional/conditional branch type to the polymorphic branch type may (at least for cases where the target address of the branch expressed by field 126 is not the PC corresponding to that entry 120) be based on a misprediction counter or on a chance-dependent test being applied on detecting a branch misprediction for the unconditional/conditional branch type, in a similar way to that discussed above for the misprediction hint 130 used to control whether to redirect length predictions to the history-dependent target address predictor 43. In some examples, separate conditional and unconditional variants of the polymorphic branch type may be supported, which differ in terms of whether they require a lookup of the branch direction predictor 44 to predict taken/not-taken outcome, but which both use a lookup of the history-dependent branch target address predictor 43 to predict the target address;

predicated-loop instruction (CPYM) type: if the length misprediction hint 130 does not satisfy a condition required for looking up the history-dependent target address predictor 43, the predicted number of loop iterations (referred to as "length") is determined based on the length prediction information 128 of the entry 120 itself. If the length misprediction hint 130 satisfies the condition, the length is predicted based on a lookup of the history-dependent branch target address predictor 43 based on the given input PC address and the current value of history information stored in the history storage circuitry 45. With the standard CPYM type, there is no need to speculatively update the history information in history storage circuitry 45 based on the predicted number of iterations, and the processing circuitry 4 can tolerate over-prediction of the number of iterations, where the actual number of iterations turns out to be less than the predicted number.

in embodiments described later with respect to FIGS. 15, 22 and 23, an additional alternate-variant of the predicated-loop instruction (CPYM-alternate type) can be supported by the branch type field 124. If this is supported, the predicted length for the CPYM instruction is predicted in the same way as for the standard CPYM type (either based on the length prediction information 128 or based on a lookup of the history-dependent branch target address predictor 43), but the branch predictor 40 in this case does speculatively update the history information 45 based on the predicted number of loop iterations, and processing of unnecessary loop iterations (even with predication) is not tolerated by the processing circuitry 4, and so a flush of the pipeline is triggered if the branch misprediction detection circuitry 46 detects that the predicted number of loop iterations does not match the actual number of loop iterations determined at the execute stage 16 for the predicated-loop instruction.

It will be appreciated that other branch types not shown in FIG. 7 could also be supported. For example, a return branch type could trigger prediction of a return branch address based on a call-return stack structure, a loop terminating branch type could trigger prediction of whether a current iteration of a loop terminating branch instruction (other than the CPYM instruction described earlier) terminates a loop based on a dedicated loop termination predictor, etc.

Figure 8:
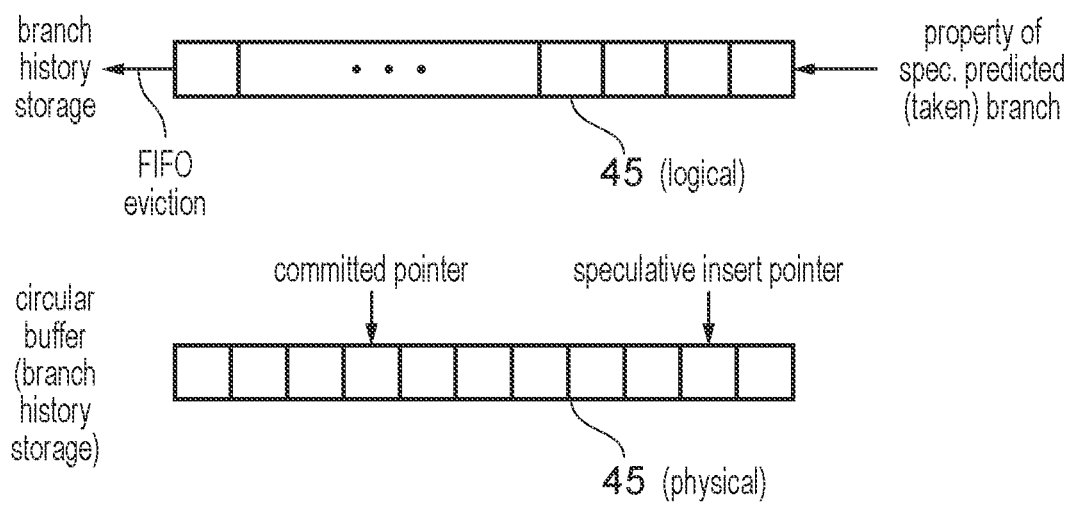
FIG. 8 illustrates an example of history information.

FIG. 8 illustrates an example of the history storage 45. The upper part of FIG. 8 shows a logical view of the history information contained by the history storage. Logically, the history information may be maintained as a FIFO (first-in, first out) buffer, where a certain number of elements of program flow history are maintained, and when an update is made to the history information, a property of a speculatively predicted taken branch is shifted in as a new element at one end of the buffer, causing all the existing elements to shift up one position and the oldest elements to be discarded. For example, the property shifted in to the history buffer could be a value derived from at least one of the program counter address and branch target address for the taken branch. For example, a hash function may be applied to the program counter address and/or branch target address for the taken branch, to derive the value shifted into the history information. Hence, the branch history information stored in history storage 45 may provide a sequential record of the most recent N taken branches in the program flow encountered before the current point of program flow whose address is being input to the branch predictor 40 to generate a latest branch prediction. Other examples could also shift properties of non-taken branches into the history storage. In this case, the property could be an indication of whether the branch is taken or not-taken. Note that the history information maintained by history storage 45 depends on the order in which the corresponding branches are encountered. The same branches occurring in a different order may cause different values of the history information to be maintained by history storage circuitry 45.

As shown in the lower part of FIG. 8, while some examples could implement the physical storage for the history storage circuitry 45 as an actual shift register in which an insertion of a new element into the history storage 45 causes physical shifting elements of the history information up one position, other examples can implement the physical storage for the history storage circuitry 45 as a circular buffer in which the elements stored in the history buffer 45 remain at static positions even when new elements are inserted, but a "speculative insert pointer" is used to track the point of the buffer at which the next element should be inserted when a branch prediction is made. When a new element is inserted into the buffer, it is inserted at a position determined based on the speculative insert pointer, and the speculative insert pointer is updated to advance to the next location of the buffer (wrapping around to the beginning of the buffer if the previous entry identified by the speculative insert pointer was at the end of the buffer). Similarly, a "committed pointer" may track the point of the buffer corresponding to the point of program flow for which all previous processing is known to be correct following resolution of earlier branch outcomes. When the branch unit 24 resolves a branch outcome for a given instruction for which a previous branch prediction was made, if the prediction was correct then the previous speculative update to the history information can be committed, by advancing the committed pointer to point to the next entry (again, wrapping around to the beginning of the buffer when necessary). If the prediction was incorrect then one or more previous speculative updates to the history information can be reversed, e.g. by rewinding the speculative insert pointer to be equal to the committed pointer, or if backup "restoration values" of the speculative insert pointer at given points of program flow were captured, by setting the speculative insert pointer to the one of those restoration values which corresponds to a point of program flow before the point of program flow at which the misprediction occurred.

Figure 9:
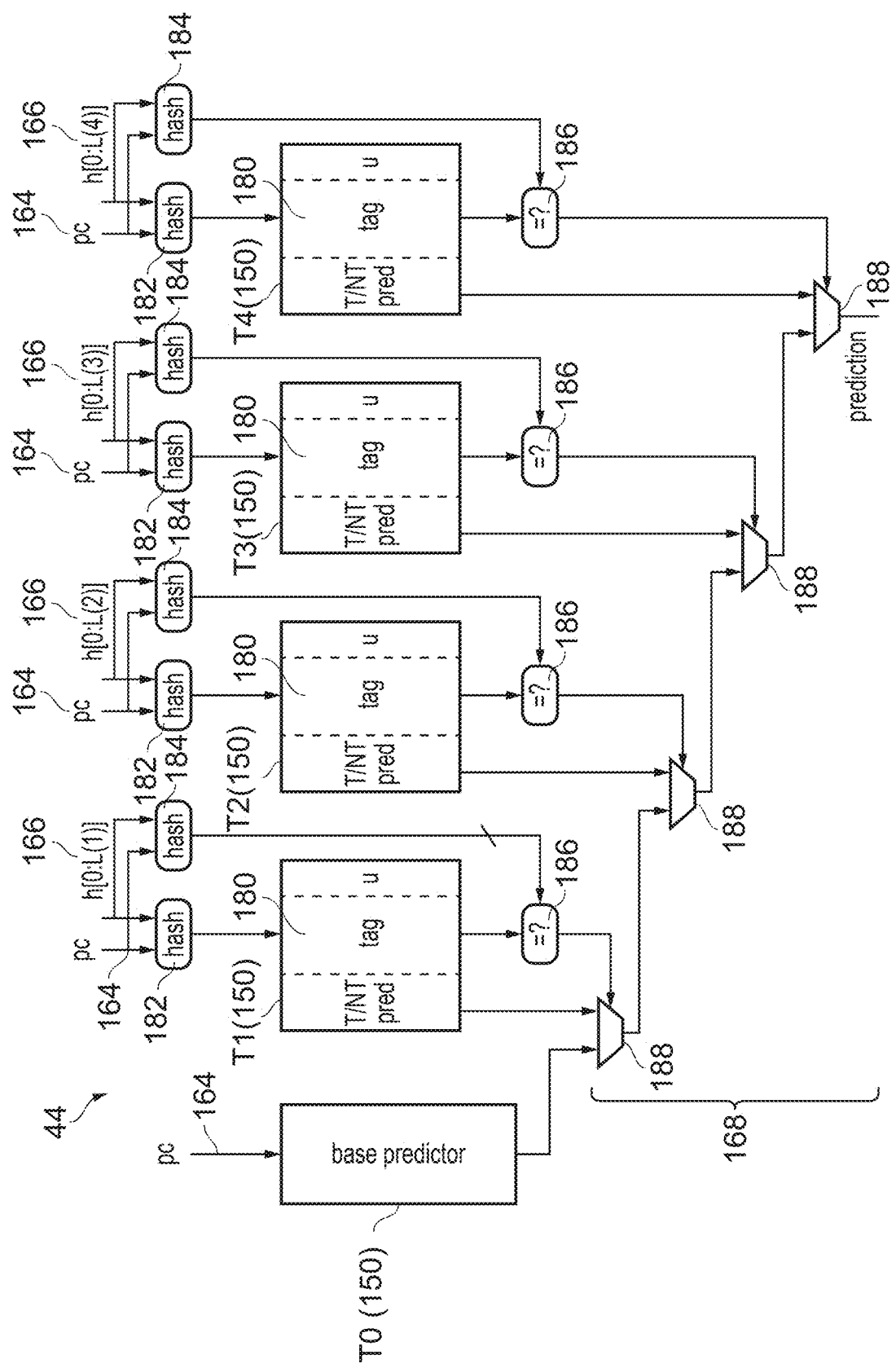
FIG. 9 illustrates an example of a branch direction predictor.

FIG. 9 shows a specific example of a branch direction predictor (BDP) 44, which is a TAGE (tagged-geometric) predictor comprising branch prediction tables 150 including a base prediction table T0 and a number of tagged-geometric (TAGE) tables T1 to T4. While this example shows four TAGE tables for conciseness, it will be appreciated that TAGE predictors could be provided with a larger number of tables if desired, e.g. 8 or 16. The base predictor T0 is looked up based on the program counter PC alone, while the TAGE tables T1 to T4 are looked up based on the PC 164 and successively increasing lengths of history information 166, so that T1 uses a shorter sequence of history information compared to T2, T2 uses a shorter sequence of history information compared to T3, and so on. For example, table T1 may use the most recent entries 0 to L(1) from the history storage 45, table T2 may use the most recent entries 0 to L(2) from the history storage (where L(2) is an entry allocated to history storage 45 less recently than entry L(1)), and so on. In this example T4 is the table which uses the longest sequence of history information. Each prediction entry specifies a prediction counter ("pred"), for example a 2-bit counter which provides a bimodal indication of whether the prediction is to be taken or not taken (e.g. counter values 11, 10, 00, 01 may respectively indicate predictions of: strongly predicted taken, weakly predicted taken, weakly predicted not taken, and strongly predicted not taken). Each entry also specifies a tag value 180 which is compared with a tag hash generated from the program counter 164 and history information 166 to detect whether the entry corresponds to the current block being looked up (the tag distinguishes between multiple blocks whose index hash values alias onto the same entry of the table). The lookup circuitry includes index hashing circuitry 182 for generating an index hash used to select one or more selected entries of the table, tag hashing circuitry 184 for generating a tag hash value to be written to a newly allocated entry or for comparing with an existing entry's tag value 180 on a lookup, and comparison circuitry 186 for comparing the tag value 180 read out from one or more looked up entries with the calculated tag hash generated by the tag hashing circuitry 184 to determine whether a hit has been detected. Each prediction entry of the branch direction predictor 44 may also have a usefulness value (u) used for controlling replacement of prediction entries (e.g. the usefulness value of a given entry may be reset to an initial value when a hit is detected against that entry or when the entry is first allocated, and the usefulness values of all entries in a given table may be incremented in response to a miss in that table or on an allocation of a new entry, so that over time the usefulness values may distinguish more frequently used entries from less frequently used entries).

For a TAGE predictor, TAGE prediction generating circuitry 168 comprises a cascaded sequence of selection multiplexers 188 which select between the alternative predictions returned by any of the prediction tables 150 which generate a hit. The base predictor 150 may be used as a fall-back predictor in case none of the other TAGE tables generate a hit (a hit occurs when the tag in the looked up entry matches the tag hash generated based on the indexing information). The cascaded multiplexers are such that if the table T4 indexed with the longest sequence of history generates a hit then its prediction will be output as the prediction result, but if it misses then if the preceding table T3 generates a hit then the T3 prediction will be output as the overall prediction for the current block, and so on, so that the prediction which gets selected is the prediction output by the table (among those tables which generated a hit) which corresponds to the longest sequence of history considered in the indexing. That is, any tables which miss are excluded from the selection, and among the remaining tables the one with the longest sequence of history in its indexing information is selected, and if none of the TAGE tables T1 to T4 generate a hit then the base predictor T0 is selected.

This approach is extremely useful for providing high performance because a single table indexed with a fixed length of branch history has to trade off the accuracy of predictions against the likelihood of lookups hitting in the table. A table indexed with a relatively short sequence of branch history may be more likely to generate a hit, because it is more likely that the recently seen history leading to the current block is the same as a previously seen sequence of history for which an entry is recorded in the table, but as the shorter sequence of history cannot distinguish as precisely between the different routes by which the program flow may have reached the current block, it is more likely that the prediction indicated in the hit entry may be incorrect. On the other hand, for the table T4 which is indexed based on the longest sequence of history, this can be extremely useful for predicting harder to predict branches which need to delve further into the past in terms of exploring the history so that that the pattern of program execution which led to that branch can be characterised and an accurate prediction made, however, it is less likely on subsequent occasions that the longer sequence of history will exactly match the sequence of history leading up to the current block and so the hit rate is lower in a table indexed based on a longer sequence of history. By providing a range of tables with different lengths of history used for indexing, this can balance these factors so that while the hardest to predict branches which would be difficult to predict using other branch predictors can be successfully predicted with the longer table T4, other easier to predict branches which do not require the full prediction capability of T4 can be predicted using one of the earlier tables indexed based on shorter history so that it is more likely that a hit will be detected on a prediction lookup, thus increasing the percentage of branches for which a successful prediction can be made and therefore improving prediction accuracy and performance. Hence, TAGE predictors are one of the most accurate predictors known.

Figure 10:
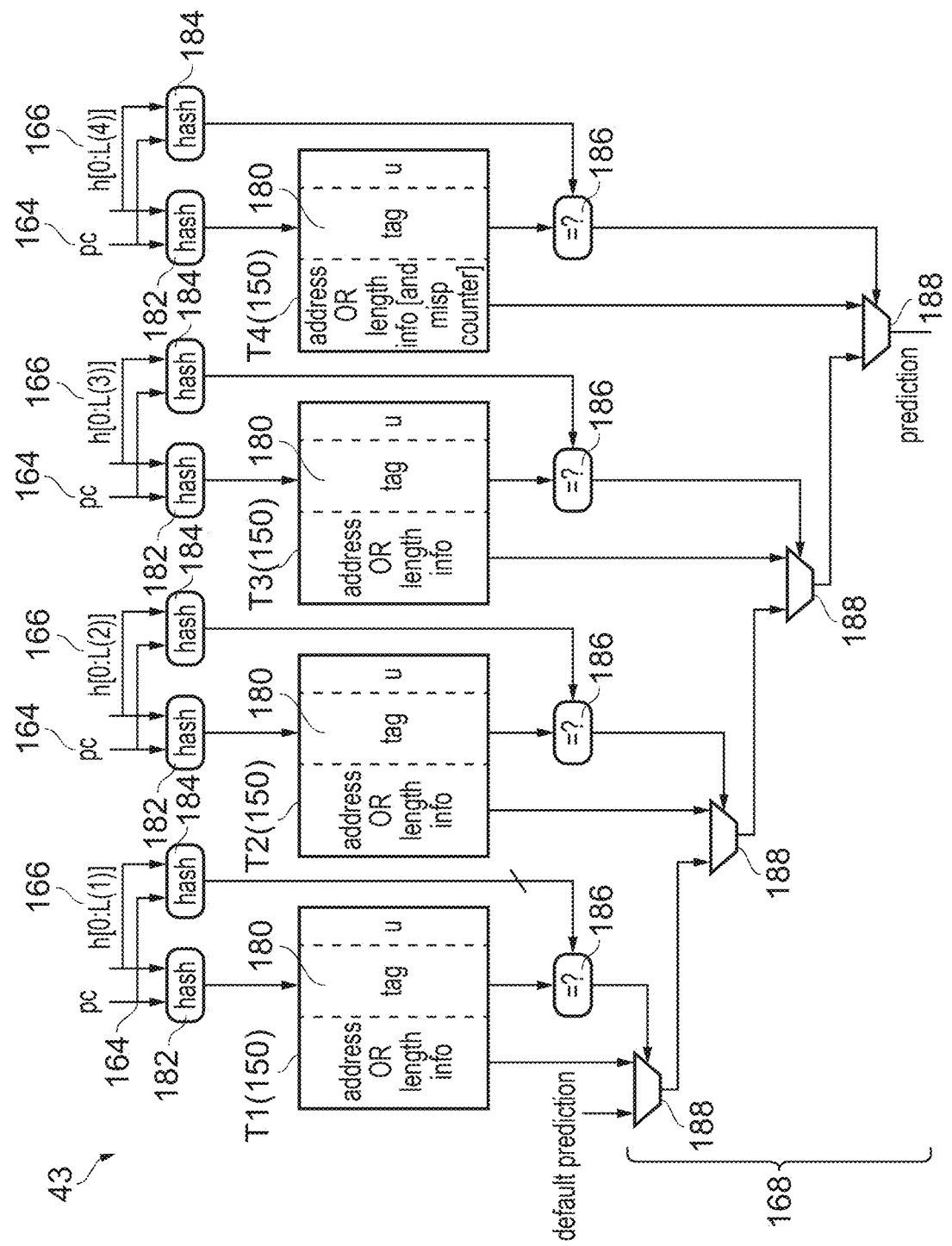
FIG. 10 illustrates an example of a history-dependent target address predictor, which can also be used to provide a predicted number of loop iterations for the predicated-loop instruction.

FIG. 10 illustrates an example of the history-dependent target address predictor 43, which has a similar TAGE structure to the branch direction predictor 44 shown in FIG. 9, with a number of tables 150 looked up based on successively increasing lengths of history information. FIG. 10 has a similar structure to the one described above for FIG. 9. However, in each TAGE table T1-T4 the prediction field "pred" used for branch direction predictions as shown in FIG. 9 is replaced with a field for indicating either a predicted target address (for polymorphic branches) or length prediction information (for predicated-loop instructions, CPYM). Also, the history-dependent target address predictor 43 does not have a base prediction table as in the example of FIG. 9, since history-independent target address prediction is already offered by the BTB 42. Instead, a default prediction for the target address is supplied by TAGE prediction generating circuitry in the case when the lookup misses in all the TAGE tables T1-T4 (in practice that scenario should not occur since if none of the tables T1-T4 of history-dependent target address predictor 43 had been configured with relevant information for a given address then the type field 124 in the corresponding BTB entry 120 for the given address should not have been set to a branch type which would cause a lookup to the history-dependent target address predictor 43). While FIG. 10 for ease of explanation shows the history-dependent target address predictor 43 having the same number of TAGE prediction tables T1-T4 as the branch direction predictor 44 in FIG. 9, it will be appreciated that these structures 43, 44 could have different numbers of TAGE prediction tables (e.g. the branch direction predictor 44 could have a greater number of tables than the history-dependent target address predictor 43).

As shown in FIG. 10, for supporting tracking a misprediction metric associated with CPYM predictions (as an example of the branch type update condition tracking circuitry 49 shown in FIG. 1 above), in some examples each entry of the longest-history table used by the history-dependent target address predictor 43, e.g. table T4 in this particular example, can also be used to store a misprediction counter which tracks the number or rate of mispredictions arising for cases when a predicated-loop instruction's length (predicted number of iterations) is predicted using that entry of the longest-history table T4. That is, the target address field of each TAGE table in FIG. 10 can be repurposed, for CPYM predictions, for storing the length predicted information for predicting the number of iterations for a CPYM or other predicated-loop instruction. As the target address itself may be much larger than the length prediction information used to predict the number of iterations, there is space to also store a corresponding misprediction counter value, which as described below can be used to determine when to switch the predicted branch type for a given address from the CPYM type to a second branch type (e.g. conditional branch or CPYM-alternate).

While FIG. 10 shows storing the misprediction counter in the longest-history table T4 itself (as there can often be spare capacity when an address field is being repurposed for providing length information for predicting CPYM instructions), it would also be possible to store the misprediction counter associated with a given address in a different structure, such as in the entry of the BTB 42 that corresponds to that address.

Also, in some implementations the branch type update condition tracking circuitry 49 may not comprise any per-address counter at all. For example, the branch type update condition tracking circuitry 49 could be a global counter or linear feedback shift register which is advanced from one state to another in response to each occurrence of a given event, such as generation of a branch prediction, detection of a branch misprediction, detection of a branch misprediction for a CPYM type of branch, etc. Hence, the use of misprediction counters to track the branch type update condition is just one possible example of the branch type update condition tracking circuitry 49.

Figure 11:
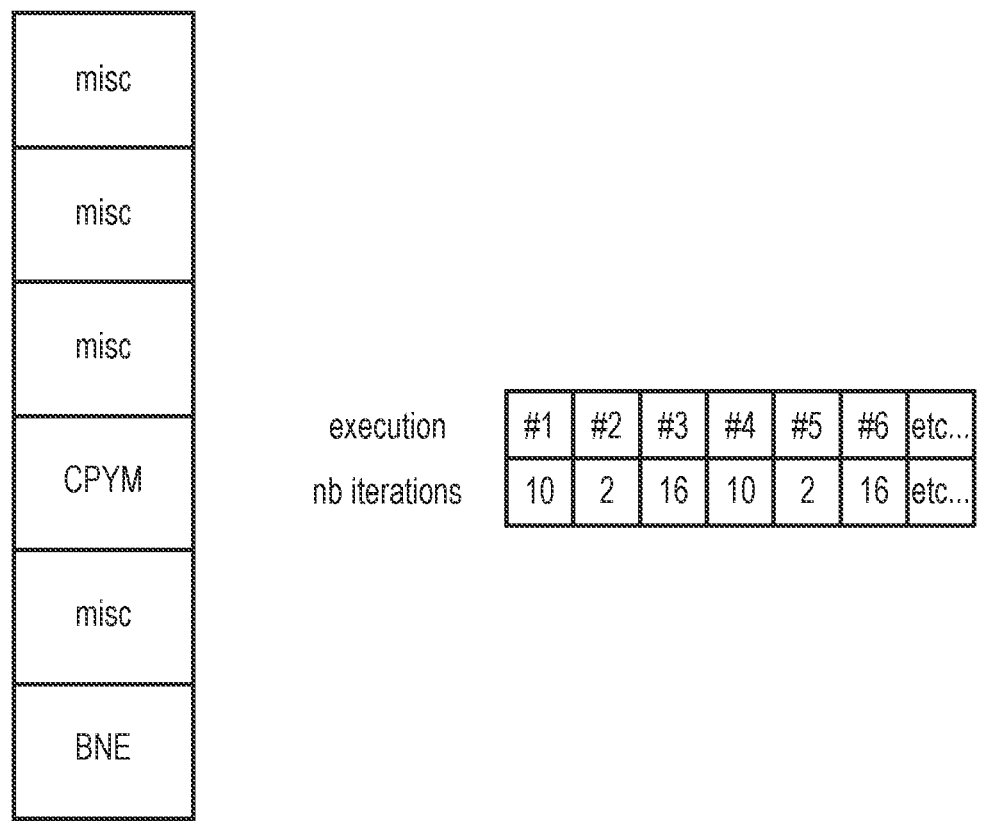
FIG. 11 illustrates an example instruction sequence where switching from a first branch prediction technique to a second branch prediction technique for a predicated-loop instruction can improve performance.

For the TAGE structures shown in FIGS. 10 and 11, allocation of an entry in a TAGE table looked up based on a longer sequence of history information may be triggered based on misprediction being detected based on an entry in a TAGE table looked up based on a shorter sequence of history information. Hence, the tables looked up based on longest history may relate to addresses for which mispredictions have continued to occur when predictions were attempted using each TAGE table 150 associated with shorter lengths of history.

FIG. 11 shows an example of an instruction sequence whose outcome may be hard to predict unless a speculative update to the history information 45 is made based on the predicted outcome of a predicated-loop (CPYM) instruction. In this example, the actual number of iterations encountered for the CPYM instruction shows cyclic behaviour so that on successive occasions of encountering the CPYM instruction, the actual number of iterations is 10, then 2, then 16, then 10, then 2, then 16, and so on. However, the branches surrounding the instances of the CPYM instruction, in this case a conditional branch instruction BNE which branches back to before the CPYM instruction if a "not-equals" condition is met by a comparison of a particular variable, may have a branch outcome which does not correlate with the cyclic pattern for the iteration length of the CPYM instruction, and so predicting the outcome of the CPYM instruction based solely on the history information derived from predictions for other instructions may be unlikely to enable the prediction of the iteration length for the current CPYM instruction. The best information for correctly predicting the number of iterations for the current CPYM instruction may be information on the number of iterations predicted for one or more previous instances of the CPYM instruction (e.g. when the previous instance predicted 10 iterations, predict 2 iterations for the next CPYM instruction; when the previous instance predicted 2 iterations, predict 16 iterations for the next CPYM instruction; when the previous instance predicted 16 iterations, predict 10 iterations for the next CPYM instruction).

Figure 12:
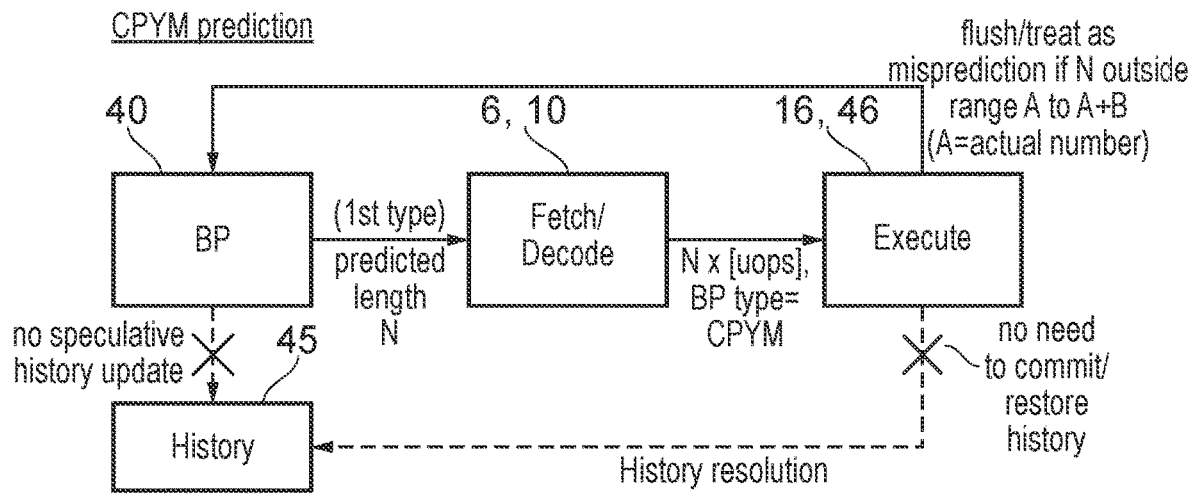
FIG. 12 illustrates generation of a first type of branch prediction for the predicated-loop instruction.

However, this information on previous run length for a predicated-loop instruction may not be available in the history storage 45 if the technique shown in FIG. 6 of allowing unnecessary iterations to be tolerated without flushing in cases where the predicted number of loop iterations is too high. FIG. 12 illustrates a first branch prediction technique used when the type field 124 in the BTB prediction entry 120 for a given address indicates a first branch type, corresponding to a predicated-loop (CPYM) instruction having been detected corresponding to that address. The branch predictor 40 generates, in response to a given address having been detected as corresponding to the first branch type, a predicted length N indicating that N iterations of the predicated loop corresponding to the given address are predicted to be required. This prediction could be based on the length prediction information 128 stored in the BTB (looked up independent of history 45) or based on the length prediction information stored in a hit entry of the history-dependent target address predictor 43. The first type of branch prediction indicating the predicted length N is provided to the fetch/decode circuitry 6, 10 which controls generation of N sets of micro-operations 60-72, one set of micro-operations for each of the predicted iterations of the predicated loop body.

When processing the first iteration of the predicated loop body, the processing circuitry (e.g. execute stage 16 and/or branch misprediction detection circuitry 46) identifies the actual number of iterations A that are actually required by the predicated-loop (CPYM) instruction. In the example of FIG. 3, say, the actual number of iterations may be determined based on the size parameter of the predicated-loop instruction, based on certain micro-architectural constraints specific to the particular processor implementation (e.g. on the number of bytes that can be processed in one cycle) and/or based on other factors such as address alignment. Alternatively, if rather than determining the full number of iterations the CPYM instruction is assessed iteration by iteration, the processing circuitry can determine an actual taken/not-taken branch outcome for a current iteration of the CPYM instruction which can be compared with what the taken/not-taken branch outcome for the current iteration should have been had the prediction of N been correct. For conciseness, subsequent examples with reference may reference determining the actual number of iterations, but it will be appreciated that these could also be handled iteration-by-iteration with separate taken/not-taken resolution for each iteration. Regardless of whether branch resolution for the CPYM instruction is handled for the loop as a whole or iteration by iteration, the processing circuitry can therefore evaluate whether or not the predicted number of iterations N provides a good enough prediction for the actual number of iterations A. In some examples, the prediction may be considered good enough if the predicted number of iterations N is in a range A to A+B, where A is the actual number of iterations and B is a margin accounting for the predicted delay associated with triggering a flush of the pipeline to flush any unnecessarily decoded iterations and resuming processing from the next instruction after the predicated-loop instruction this recognises that if the predicted number of iterations as a large margin over the actual number, it can be more efficient to trigger a flush than wait for all the unnecessary iterations to be processed, but if the predicted number of iterations N is exactly correct or is less than a smaller number of iterations B greater than the actual number of iterations A then it can be faster to allow the unnecessary iterations to be executed with predication rather than triggering a flush.

However, this approach limits the extent to which it is practical to update the history information 45 to reflect the number of iterations determined for the predicated-loop instruction. If the history information 45 was updated based on the number of iterations determined for the predicated-loop instruction, then in the absence of a flush many possible predicted values N may correspond to the same architecturally correct outcome of the CPYM instruction. This may frustrate prediction using the history-dependent predictors 43, 44 which look up prediction entries based on the history information, as the tolerance of incorrect predictions that over-predict the actual number of loop iterations mean that prediction state updates corresponding to a given CPYM instruction may be scattered across multiple distinct entries of the TAGE tables 150 selected based on different possible predicted run lengths (e.g. 10, 11, 12, 13 for the instance #1 in FIG. 11 where the actual run length is 10), making it hard to successfully train the prediction indicated by a particular entry to predict the behaviour of the corresponding instruction. Therefore, to preserve prediction accuracy for other branches, it can be safest, when using the first branch prediction scheme for CPYM instructions, to suppress any speculative updates to the branch history based on the CPYM length prediction. This means that on resolution of the actual run length A for the CPYM instruction, there is no need for the branch resolution logic in the processing circuitry 16, 46 to commit or restore any previous speculative update to history information 45. For many instances of CPYM instructions, this approach can be acceptable and helps to improve performance by reducing the frequency with which flushes are needed. However, for workload patterns as shown in FIG. 11 where the history of the CPYM instruction itself is the only information that could adequately predict future CPYM behaviour, the approach shown in FIG. 12 can greatly harm performance as there can be frequent under-predictions of the number of iterations required. As well as costing performance this may reduce power consumption efficiency because effort is wasted in fetching and decoding incorrect instructions.

Figure 13:
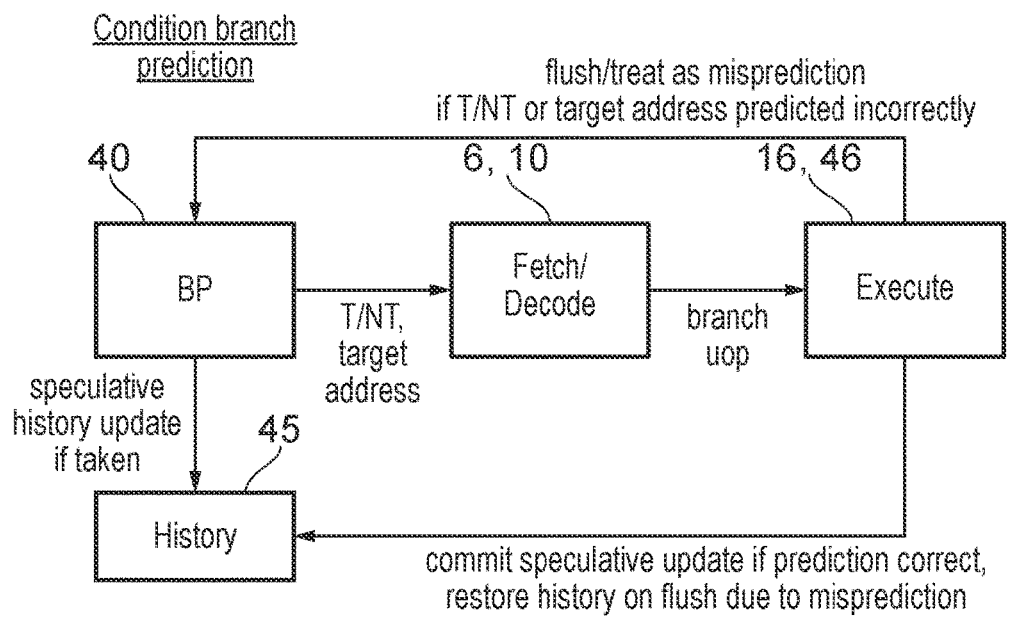
FIG. 13 illustrates generation of a branch prediction for a conditional branch instruction.

FIG. 13 shows a second branch prediction scheme that can be used when the branch type is a conditional branch instruction. In this case, the branch prediction circuitry 40 provides, as a second type of branch prediction, a branch outcome prediction (taken or not-taken) derived from a lookup of the branch direction predictor 44 and a target address prediction derived from either the target address field 126 of the corresponding BTB entry 120 or the address information from a corresponding entry identified in a history-dependent lookup of the history-dependent target address predictor 43. If the branch is predicted taken, then the history information 45 is speculatively updated based on a property of the branch (e.g. a function of the branch's instruction (PC) address and/or the predicted branch target address). The fetch/decode circuitry 6, 10 controls fetching and decoding of instructions subsequent to the branch depending on the predicted branch direction and target address. When the processing circuitry 16, 46 resolves the corresponding branch outcome, if the branch was correctly predicted then the speculative update made to the history information 45 for that branch is committed. If the branch prediction of either the branch direction or the target address was incorrect, a flush of incorrectly fetched/decoded micro-operations is triggered, the previous speculative update to the history 45 is reversed (e.g. by rewinding the speculative insert pointer to match the commit pointer or restoring a previous version of the commit pointer).

Figure 14:
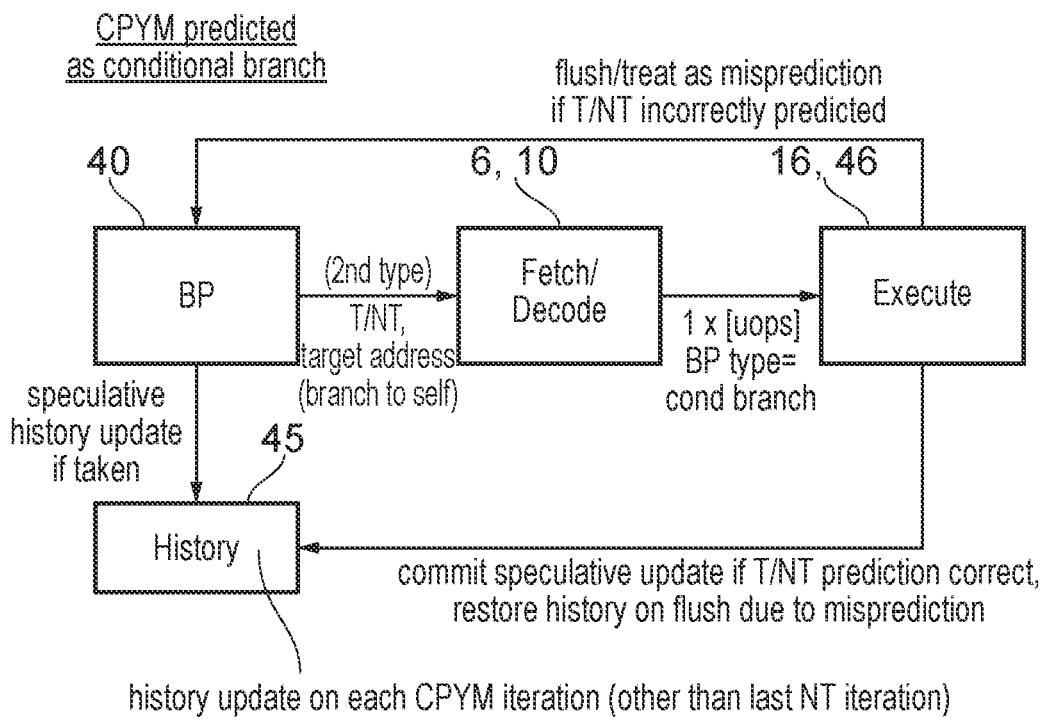
FIG. 14 illustrates a first example of generation of a second type of branch prediction for the predicated-loop instruction, based on treating the predicated-loop instruction as if it was a conditional branch instruction.

FIG. 14 illustrates how the second branch prediction scheme use a conditional branch as can be reused to also predict behaviour for predicated-loop instructions such as the CPYM instruction. As mentioned earlier, the CPU way instruction behaves essentially as a conditional branch to itself, which is taken for all but one of the loop iterations of the predicated loop body 60-72 and then is not taken on the last iteration through the predicated loop. Hence, the CPYM behaviour could be predicted by treating the CPYM instruction as a standard conditional branch instruction for which the target address 126 in BTB 42 or the history-dependent target address predictor 43 is set to the PC address of the CPYM instruction itself. Hence, when the second type of branch prediction is made for the CPYM instruction, a taken/not-taken prediction and target address prediction is made in the same way as shown in FIG. 13 for a conditional branch, and speculative update of the history information 45 is made based on the second type of branch prediction. This time, as the prediction only provides information about the outcome of a single iteration of the predicated loop, the fetch/decode circuitry 6, 10 is only able to deduce from the second type of branch prediction whether to fetch/decode an additional iteration of the predicated-loop micro-operations, rather than determining the full set of N iterations based on the output of a single prediction cycle as in the example of the first type of branch prediction shown in FIG. 12. Hence, in cases where the first type of branch prediction of FIG. 12 gives adequate performance, the first type of branch prediction can be more power-efficient as the behaviour of the CPYM instruction can be predicted in a single prediction cycle, rather than needing N cycles of lookup as in the alternative approach of FIG. 14. Nevertheless, if the first branch prediction technique is not working well, the second approach shown in FIG. 14 for treating the CPYM instruction as a conditional branch instruction can be used instead to allow for history updates based on the outcome of the CPYM instruction.

Based on the second type of branch prediction made for the CPYM instruction identified in the BTB type field 124 as being the conditional branch type, a speculative update is made to the history information 45 based on a property of the branch (e.g. a function applied to the PC and/or branch target address, which in the case of the CPYM instruction will both be the same). As each second type of branch prediction in FIG. 14 provides a single taken/not-taken prediction for an individual iteration, this means that if the CPYM instruction requires more than one iteration, multiple separate updates may be made to the history information 45 in response to that instruction, as each cycle of branching to self may trigger a further update of the history information 45. For example, a sequence of updates corresponding to TTTTT . . . TTN iterations of the branch may made to the history information 45. While this may push out other history information from earlier parts of the program flow, for the hard-to-predict CPYM cases this may be preferable to not recording any history information about the number of CPYM iterations at all. The sequence of TTTT . . . TTN iterations of the branch helps identify the particular number of CPYM iterations encountered on previous attempts at executing the CPYM instruction and therefore allows different prediction state entries to be trained distinguishing the scenarios where the predicted number of iterations should be 10, 2 or 16 in the example of FIG. 11.

Hence, when the processing circuitry 16, 46 executes the CPYM micro-operations, it may again resolve the correct number of iterations on the first iteration counters, but this time as the standard conditional branch prediction functionality has been invoked rather than the special CPYM scheme shown in FIG. 12, there is no tolerance for over-predicting the required number of iterations. If there is any CPYM branch predicted taken when it should have been not-taken (i.e. the number of iterations was predicted to be larger than the actual number of iterations), a flush of the unnecessarily fetched/decoded sets of micro-operations may be triggered. Also, at branch resolution, depending on whether the predicted branch direction and target address were correct or incorrect, the previous speculative update of the history information 45 is either committed or reversed in the same way as for FIG. 13.

Figure 15:
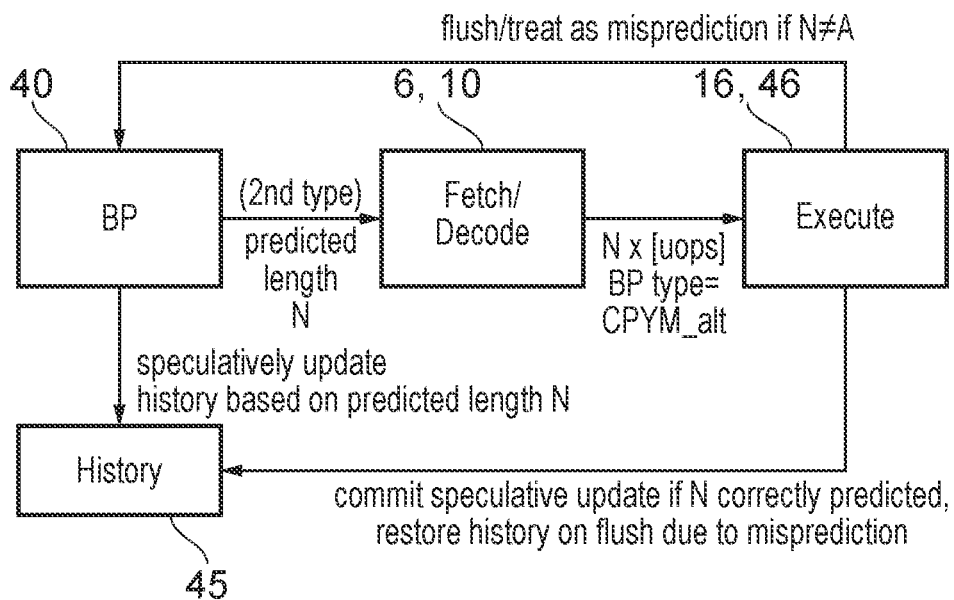
FIG. 15 illustrates a second example of generation of the second type of branch prediction for the predicated-loop instruction.

FIG. 15 shows an alternative way of incrementing a second type of branch prediction which could be implemented for predicated-loop instructions such as the CPYM instruction. In this example, rather than being treated as a standard conditional branch with a single taken/not-taken decision, the CPYM instruction can still be treated as a distinct branch class and the second type of branch prediction may indicate the predicted number of iterations N for the loop as a whole, predicted in the same way as described for FIG. 12. However, this time a speculative update of the history information 45 based on the predicted number of iterations N is made, e.g. pushing a length value indicating the number of iterations N into the history buffer 45. However, unlike in FIG. 12, if the processing circuitry 16, 46 at the branch resolution stage identifies that there has been any incorrect prediction where the actual number of loop iterations A does not match the predicted number of loop iterations N (either by an actual comparison of N and A, or by an indirect comparison such as determining on each iteration whether or not the taken/not-taken decision for that iteration is consistent with the taken/not-taken outcome which would have been performed for that iteration had the predicted number of loop iterations N been correct). If the predicted number of loop iterations N is determined to be incorrect, then a flush is triggered and there is no tolerance for unnecessary loop iterations being processed. The previous speculative update to the history information 45 is committed if the prediction of N was correct (N=A) or is reversed if the prediction of N was incorrect (N does not equal A). While it may seem that such a flush when N>A is unnecessary as shown in FIG. 6, in scenarios such as the one shown in FIG. 11 this can give better performance by enabling the history information 45 used to predict the outcome of the CPYM instruction to depend on the number of iterations N predicted for the CPYM instruction itself.

Hence, FIGS. 14 and 15 show two alternative examples of a second branch prediction technique which would enable prediction of the behaviour of the predicated-loop instruction in a manner which allows for speculative updates of history information based on the CPYM instruction. Whether the first branch prediction technique of FIG. 12 or the second branch prediction technique of FIG. 14 or 15 is used for a given CPYM instruction at a given address will vary from one address to another and from one processing workload to another. Therefore, it can be useful to provide a heuristic to track whether earlier attempts at predicting the CPYM instruction using the first branch prediction scheme of FIG. 12 have encountered sufficiently frequent mispredictions that a switch to the second branch prediction scheme of FIG. 14 or 15 is justified. Some examples schemes for tracking this heuristic can include:

if a prediction of a CPYM branch type is generated based on an entry of the longest-history table T4 of the history-dependent predictor and that entry causes the number of iterations for the CPYM branch at a given address to be mispredicted, a random chance test is applied (e.g. based on a linear feedback shift register), and if the test provides a particular outcome (e.g. the value output by the LFSR matching a given value), then the branch type update condition is satisfied and the branch type for the given address is updated to the second branch type.

a counter can be provided per address in the BTB 42, e.g. as an additional field included in bits reused from the target address field 126 of the BTB entry 120, with that field for CPYM branches tracking the number or rate of mispredictions for the CPYM instruction at the corresponding address. If this counter reaches a threshold then the branch type 124 for that entry 120 is updated from CPYM branch type (first branch type) to second branch type (e.g. conditional branch type or CPYM-alternate branch type).

a counter can be provided per entry in at least one table (e.g. the longest-history table T4 of the history-dependent predictor 43), and that counter is incremented on a misprediction based on that entry. Hence, a counter is provided per combination of address and history information. When, the counter of a hit TAGE entry of predictor 43 used for a given CPYM branch prediction reaches the threshold, the branch type 124 in the corresponding BTB entry 120 is changed to the second branch type.

It will be appreciated that these are just three examples of implementing a heuristic for identifying CPYM branches most likely to suffer from the misprediction problem described with respect to FIG. 11.

As shown in FIGS. 12, 14 and 15, when the branch prediction circuitry 40 supports two different techniques by which a given CPYM instruction can have its outcome predicted, including a first branch prediction method (FIG. 12) where the history information 45 is not speculatively updated and a second branch prediction method (FIG. 14 or 15) where the history information 45 is speculatively updated, the execute stage 16 cannot determine from the encoding of the CPYM micro-operations themselves which branch prediction approach has been used. Whether the first/second branch prediction method has been used influences whether the execute stage 16, 46 needs to commit or reverse any speculative update to the history information 45 based on the resolved outcome for the CPYM instruction, as well as whether the execute stage 16 can tolerate over-prediction of the number of iterations required. Therefore, as well as the micro-operations themselves, the execute circuitry 16 may be supplied with an indication of which of the first/second types of branch prediction was used to predict the number of iterations for that particular CPYM loop. This indication may be derived from information supplied by the branch prediction circuitry 40 to the fetch/decode circuitry 6, 10 indicating which type of prediction was applied in a given cycle. The fetch/decode circuitry 6, 10 can use that information to determine, if a CPYM instruction is decoded into micro-operations for a given address, whether to indicate to the execute stage 16 that the first/second branch prediction type was used.

Figure 16:
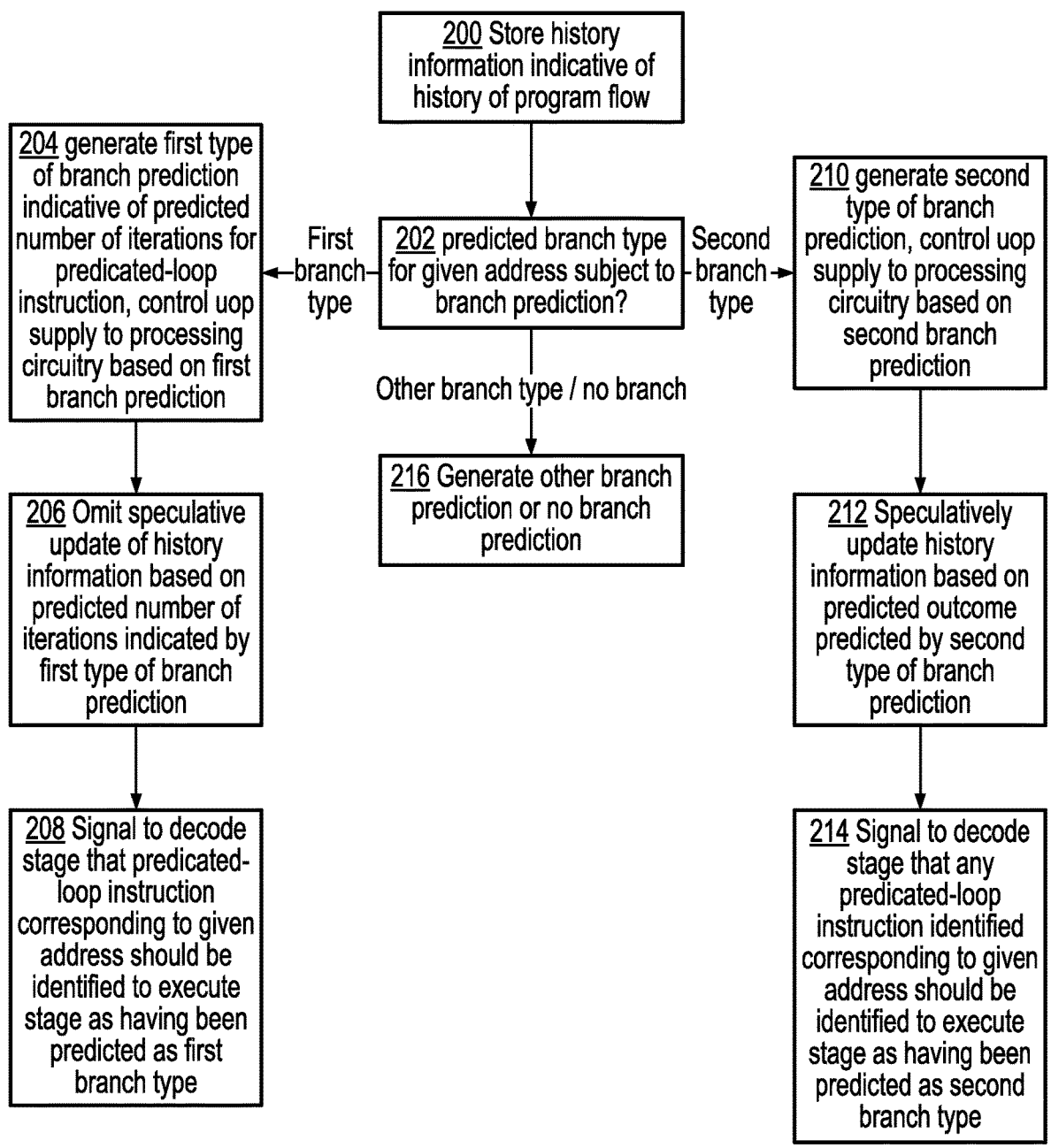
FIG. 16 illustrates steps for generating a branch prediction.

FIG. 16 is a flow diagram illustrating steps for controlling branch prediction. At step 200, the history storage circuitry 45 stores history information indicative of a history of program flow. For example, the history information may be maintained based on properties of taken branches encountered in the program flow. The history information may represent sequential information which provides a sequence of entries each representing an occurrence of at least one taken branch. The logical position of the entry within the history information representing a particular branch is logically shifted towards one end of the history information as entries for further taken branches are inserted (either by actually shifting up the history information in a shift register, or by logically shifting up the history information by advancing pointers to a circular buffer).

At step 202, the branch prediction circuitry determines, for a given address subject branch prediction, a predicted branch type for that given address. For example, the branch prediction circuitry may look up the BTB 42 based on the given (PC) address and determine the predicted branch type based on the branch type field 124 of an entry detected as corresponding to the given address. If the BTB look up misses, the given address is treated as not having any taken branch, and so subsequent instruction fetching would proceed sequentially until another branch is predicted.

If a first branch type is identified for the given address, then at step 204 the branch prediction circuitry 40 generates a first type of branch prediction indicating a predicted number of iterations N for a predicated-loop instruction predicted to occur at the given address. At step 206, speculative update of the history information stored in history storage 45 based on the predicted number of iterations indicated by the first type of branch prediction is omitted (i.e. there is no update of the history information corresponding to the first type of prediction made for the predicated-loop instruction). This corresponds to the approach shown in FIG. 12. At step 208, the branch prediction circuitry 40 signals to the decode stage 10 of the pipeline 4 that any predicated-loop instruction corresponding to the given address should cause micro-operations supplied to the execute stage 16 to be identified as having been predicted as the first branch type (predicated-loop instruction type). The first type of branch prediction made by the branch prediction circuitry 40 controls the front end circuitry 6, 10 to supply micro-operations to the execution logic 16 of the processing circuitry (e.g. the front end circuitry 6, 10 decodes the predicated-loop instruction to generate N sets of micro-operations, one for each predicted iteration).

If a second branch type is identified for the given address, then at step 210 the branch prediction circuitry 40 generates a second type of branch prediction indicating a predicted outcome of the branch. For example, the second type of branch prediction could indicate either the not-taken/taken outcome of the branch (in the example where the second type of branch prediction is a conditional branch type as in FIG. 14) or could indicate a predicted number of loop iterations N (in the example of the alternative-type of CPYM instruction of FIG. 15). The branch prediction circuitry 40 provides the second type of branch prediction to the front end circuitry 6, 10 which controls supply micro-operations to the execute stage of the processing circuitry based on the second type of branch prediction. For the second branch type, at step 212 the history information 45 is speculatively updated based on the predicted outcome predicted by the second type of branch prediction. At step 214, the branch prediction circuitry 40 signals to the decode stage 10 of the pipeline 4 that any predicated-loop instruction corresponding to the given address should cause micro-operations supplied to the execute stage 16 to be identified as having been predicted as the second branch type.

If the branch type was identified at step 202 to be another branch type other than first/second branch types, or if the BTB lookup missed so that no branch is predicted to occur at the given address, then at step 216 another type of branch prediction is applied (e.g. return address prediction, polymorphic branch prediction) or no branch prediction is generated and instruction fetching/decoding will continue sequentially beyond the given address.

Figure 17:
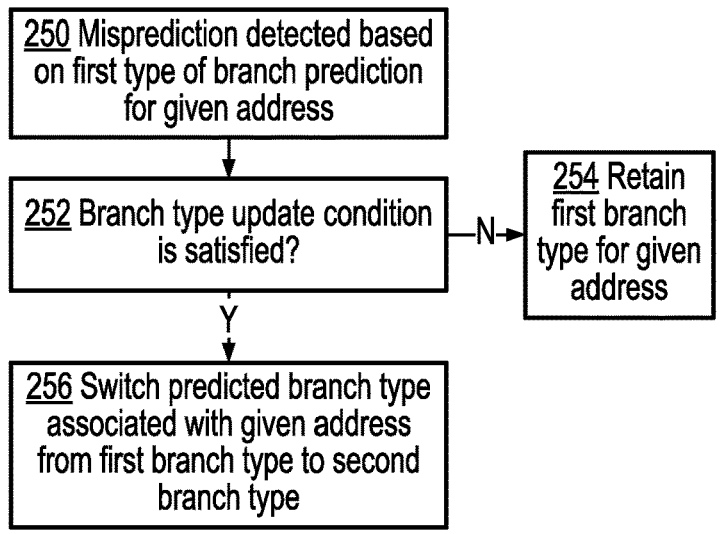
FIG. 17 illustrates steps for switching a predicted branch type from a first branch type to a second branch type in response to determining that a branch type update condition is satisfied following misprediction based on the first branch type.

FIG. 17 illustrates switching of branch type in response to a branch type update condition being satisfied when a misprediction occurs based on the first type of branch prediction. At step 250, a misprediction is detected by the processing circuitry 16, 46 associated with the first type of branch prediction made for a given address. In some examples, this misprediction could be any misprediction of the number of iterations predicted by the branch prediction (where misprediction is considered a case where the number of iterations was not good enough to avoid the flush scenario). In other examples, only certain classes of misprediction event could be detected as the type of misprediction at step 250 that triggers evaluation of the branch type update condition at step 252. For example, step 250 might detect whether there has been a misprediction of the predicted number of iterations for a CPYM instruction based on an entry of the longest-history TAGE table 150 of the history-dependent target address predictor 43, and not when the misprediction is based on entries in tables 150 of predictor 43 searched based on shorter sequences of history or when the misprediction is based on length prediction information in a history-independent prediction structure (BTB) 42.

In response to the misprediction being detected, at step 252, the branch prediction circuitry 40 determines whether a branch type update condition is satisfied. For example, the branch type update condition could be considered satisfied if a counter associated with the given address has reached or exceeded a given threshold metric, or if a chance-dependent test evaluated in response to the misprediction being detected gives a first outcome (see FIG. 20 described below). If the branch type update condition is not satisfied, then at step 254 the first branch type is retained for the given address. If the branch type update condition is satisfied, then at step 256 the branch type 124 associated with the given address is updated in the BTB 42, to switch from the first branch type (CPYM branch type) to the second branch type (e.g. conditional branch type or CPYM-alternate branch type).

Figure 18:
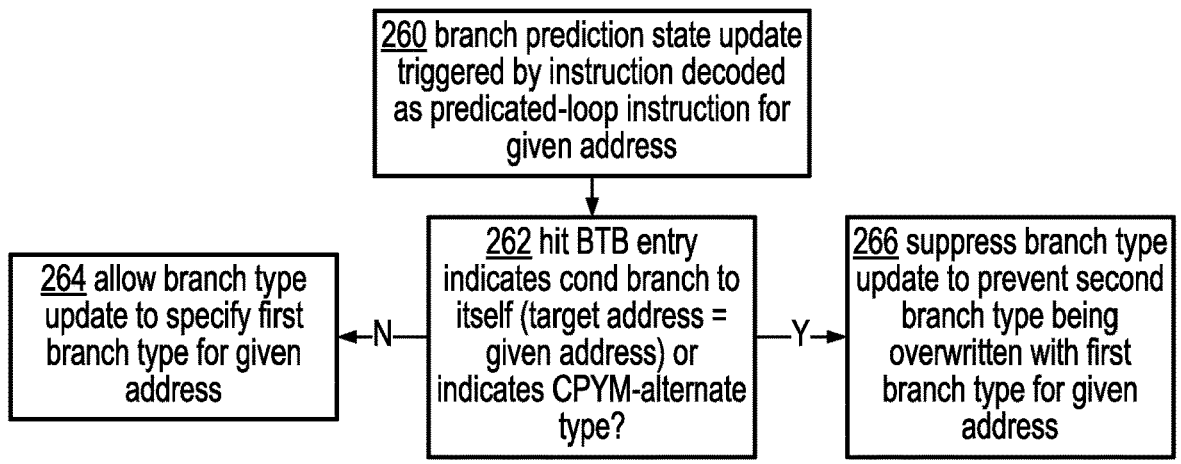
FIG. 18 illustrates setting of a predicted branch type for a given address to a first branch type.

FIG. 18 illustrates steps for setting the predicted branch type 124 for a given address when initially identifying a predicated-loop instruction as present at that address. At step 260, a branch prediction state update is triggered by an instruction decoded by decode stage 10 as being a predicated-loop instruction having a program counter address corresponding to the given address. This feedback for causing the branch prediction state update could be implemented in different ways. In some examples, the decode stage 10 may feed back information about decoded instructions to the branch predictor 40 to allow for early updates of the instruction type field 124. In other examples, the feedback on detection of a particular type of instruction may be supplied from the execute stage 16 once the branch outcome for the instruction is resolved. Either way, in response to a branch prediction state update triggered by detection that a decoded instruction at the given address is a predicated-loop instruction, at step 262 the branch prediction circuitry looks up the BTB 42 based on the given address and determines whether any existing entry corresponds to the given address. If there is an existing valid entry corresponding to given address, at step 262 the branch prediction circuitry 40 determines (for an implementation where the second branch prediction scheme used for CPYM instructions is the conditional branch scheme of FIG. 14) whether, for the existing valid BTB entry 120 corresponding to the given address, the type field 124 indicates the conditional branch type and the predicted target address 126 is the given address itself, or determines (for an implementation where the second branch prediction scheme is the CPYM-alternative scheme of FIG. 15) whether the predicted branch type for the given address is currently indicated by type field 124 as being the CPYM-alternate branch type. If there is no hit against an existing valid BTB entry indicating a CPYM-alternate branch or a conditional branch for which the target address is the given address itself (e.g. the hit BTB entry indicated a different branch type or a conditional branch to an address other than the given address, or there was no valid entry in the BTB corresponding to the given address), then at step 264 the branch type update triggered by the predicated-loop instruction for the given address is allowed, and the type field 124 for a newly allocated BTB entry (selected according to a replacement policy) or the corresponding existing BTB entry for the given address is set to the first branch type (corresponding to a predicated-loop, CPYM, instruction). If there is a hit in a BTB entry which indicates a conditional branch to itself or indicates the CPYM-alternate type of branch, then at step 266 the branch type update is suppressed, to prevent the second branch type (conditional branch type or CPYM-alternative type) being overwritten with the first branch type (CPYM type) for the given address. This reflects that, in an implementation using the conditional branch type or CPYM-alternate branch type to predict CPYM instructions which have been demoted to conditional branch type based on a misprediction heuristic as shown in FIG. 17, it would be undesirable to allow that demotion to be subsequently reversed the next time the CPYM instruction is decoded at the decode stage 10, otherwise the problem of missing CPYM-dependent history information not being available for predicting the outcome of the CPYM instruction in the pattern similar to that of FIG. 11 will persist.

Figure 19:
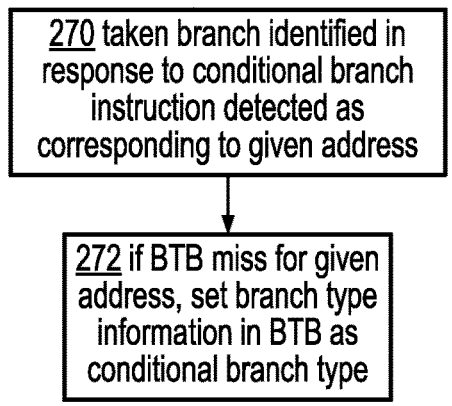
FIG. 19 illustrates setting of a predicted branch type for a given address to a second branch type.

FIG. 19 illustrates steps for setting the type field 124 of BTB entries in response to conditional branch instructions. At step 270, the branch resolution logic in execute stage 16, 46 identifies that a taken branch has occurred in response to a conditional branch instruction corresponding to given address. In response, at step 272 if there is a BTB miss for that given address, a new BTB entry is allocated for that branch and the branch type information 124 in the newly allocated BTB entry 120 is set to indicate that the predicted branch type for the given address is the conditional branch type (conditional branch type, which in some examples also acts as the second branch type). If the BTB lookup based on the given address detects a hit, that entry should already be indicated as either the conditional branch type or another type such as a polymorphic branch. If the BTB lookup detects a hit and the predicted branch type 124 is already set to indicate another type of branch other than the conditional branch then there is no need to update the current branch type indicated, as a more specialised kind of prediction may already be in place for the given address (e.g. history-dependent prediction of target address for polymorphic branches using the history-dependent target address prediction structure 43).

Figure 20:
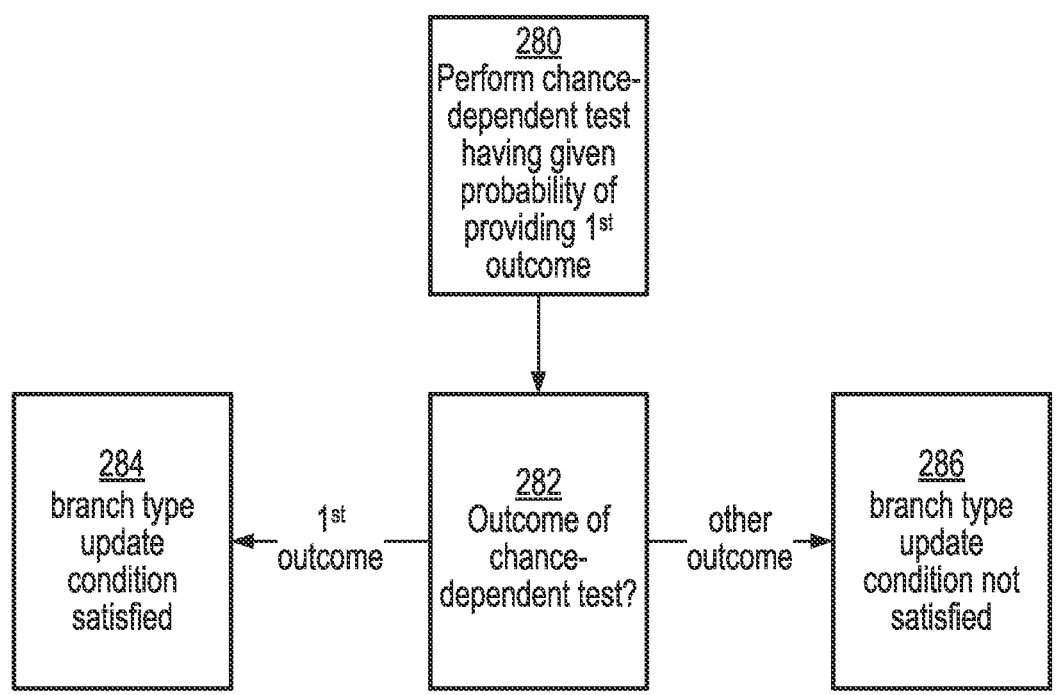
FIG. 20 illustrates an example of evaluating the branch type update condition based on a chance-dependent test.

FIG. 20 illustrates an example of a chance-dependent test which can be used to evaluate the branch type update condition. At step 280 the branch predictor 40 performs a chance-dependent test. The chance-dependent test may be analogous to a dice roll or a lottery draw, providing a given probability (greater than 0 and less than 1) of having the first outcome, where it is a matter of chance whether the first outcome will occur for any given instance of performing the test. Hence, even if two instances of detecting a given misprediction at step 250 of FIG. 17 are based on the same parameters (same internal state of the prediction entry used to generate the first type of branch prediction which led to the misprediction being identified), the chance-dependent test may nevertheless provide different outcomes on different occasions. Providing some statistical variation in whether the switch of branch type at step 256 is applied can be helpful to provide approximate control of the rate of mispredictions needed for a given address before the branch type update step 256 is triggered, without necessarily needing a large counter per address to track the rate of mispredictions. For example, if the probability is 1/P, then applying the branch type update in a statistical manner on 1/P occurrences of the given class of misprediction detected at step 250 can, on average, be approximately equivalent to counting occurrences of such mispredictions with a log 2(P)-bit counter and triggering the branch type update of step 256 when the counter overflows. Although there could be some addresses for which the branch type update is triggered after fewer than P mispredictions, and other addresses for which more than P mispredictions occur before the branch update is triggered for that address, on average this approach means it is more likely that prediction entries corresponding to CPYM instructions which are frequently mispredicted are switched to the second branch type than entries corresponding to CPYM instructions which are less frequently mispredicted, as the more frequently mispredicted instances will have more chances to pass the chance-dependent test.

The chance-dependent test could be implemented by the branch type update condition tracking circuitry 49 in many different ways. For example, a random number generator (or pseudorandom number generator) could be used to generate a (pseudo) random number with a certain number of bits, and if that number has a particular value then the test is considered to provide the first outcome while other values of the (pseudo) random number are considered to provide other outcomes. The probability of the first outcome occurring therefore depends on the number of bits in the (pseudo) random number.

Another approach can be that the branch type update condition tracking circuitry 49 comprises a counter which is incremented or decremented each time a particular event occurs. The counter can be shared globally between all addresses (rather than a counter provided in particular prediction entries corresponding to a particular address). The current value of the counter can be checked when the chance-dependent test needs to be performed for a given instance of a misprediction for a CPYM instruction, and if the counter (or a subset of bits of the counter) has a particular value then the test is considered to provide the first outcome while other values of the counter are considered to provide other outcomes. The event which triggers the counter to advance could be any event and does not need to be related to the prediction of the number of iterations of the CPYM instruction, or even related to branch prediction per se. For example, there may be an existing counter in the system which counts events which are completely uncorrelated with the loop iteration prediction, such as the number of elapsed processing cycles, the number of executed instructions, etc. Alternatively, the event could be a branch predictor related event, such as a lookup to a given one of the prediction structures 42, 43, 44. Alternatively, the event which advances the counter could be specific to CPYM instructions, e.g. generation of a prediction for which the branch type 124 is the first (CPYM) branch type, or detection for a misprediction for a CPYM branch. Regardless of what event is counted by the counter, by sampling a subset of bits of such a counter (e.g. the least significant N bits, which are likely to have a more even probability distribution in value than more significant bits), a value may be obtained which has a relatively even probability of having any particular numeric value, with the number of bits sampled defining the probability with which the first outcome (a particular value of the sampled bits) occurs.

Similarly, other data values present on the system (not necessarily counters) could have bits sampled from the data value for use in the chance-dependent test. For example, arbitrarily selected bits of control state sampled from buses, registers, memory etc. (in some cases selected from multiple locations which store or transmit unrelated data values) may be sampled to provide a control value which can be compared against a predetermined value, and be considered to provide the first outcome when the control value matches the predetermined value. Again, the number of bits sampled for the chance-dependent test affects the probability with which the sampled bits have a certain value corresponding to the first outcome.

Regardless of how the chance-dependent test is implemented, at step 282 the prediction circuitry 40 determines the outcome of the chance-dependent test (e.g. whether a random/pseudorandom value, counter or sampled value being tested matches a required value or meets some other condition such as a first subset of bits being equal to a second subset of bits). If the outcome is the first outcome (the tested value matches the required value or meets the required condition), then at step 284 the branch type update condition is determined to be satisfied. If the outcome of the chance-dependent test is another outcome other than the first outcome (the tested value does not have the required value or does not meet the condition), then at step 284 the branch type update condition is determined not to be satisfied.

Figure 21:
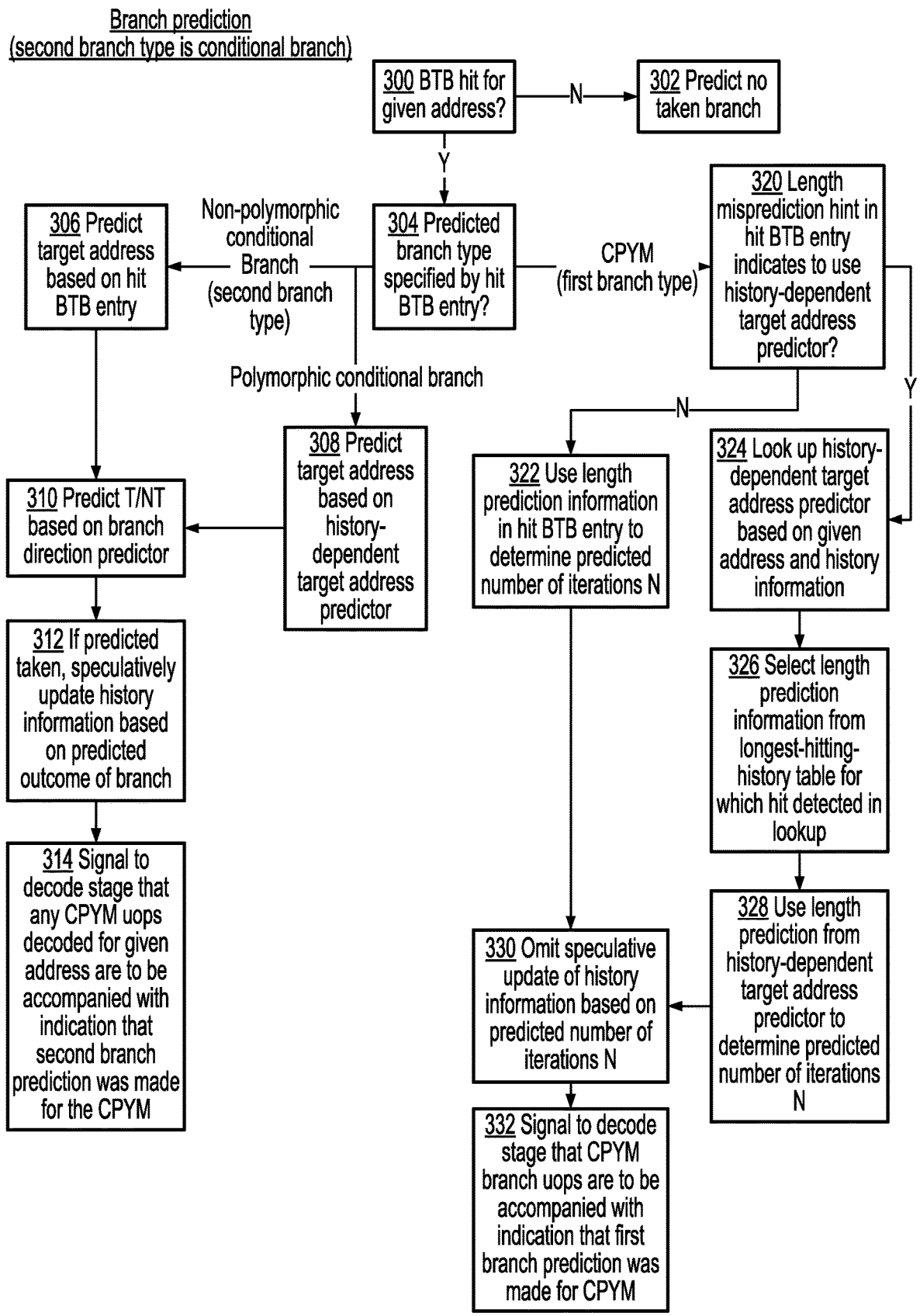
FIG. 21 illustrates steps for generating branch predictions for a first example where the second branch type is a conditional branch.
Figure 22:
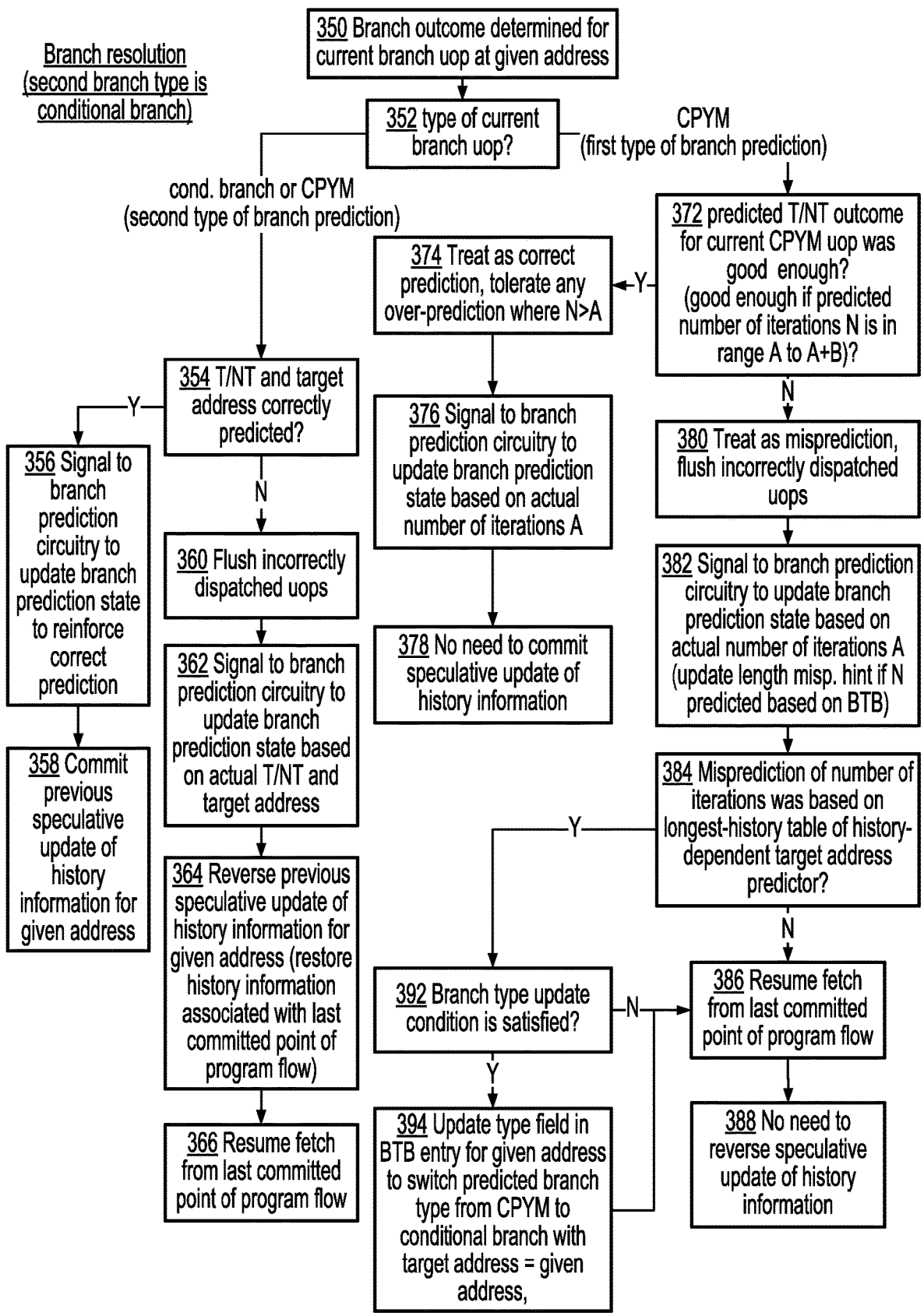
FIG. 22 illustrates steps for updating prediction state based on branch resolution for the first example.

FIGS. 21 and 22 Illustrates an example based on the second branch type being the conditional branch type described above. FIG. 21 illustrates steps for the branch prediction circuitry 40 to generate branch predictions while FIG. 22 illustrates steps for branch resolution by processing circuitry 16, 46.

At step 300 of FIG. 21, the branch prediction circuitry 40 looks up a given address in the BTB 42 and detects whether a hit is detected in the BTB 42 for the given address (that is, whether the given address corresponds to the address tag 122 of any of the subset of BTB entries 120 that are selected for the lookup based on given address). If the given address misses in the BTB 42, then at step 302 the branch prediction circuitry 40 predicts that there is no taken branch at the given address, and controls the fetch circuitry 6 to continue sequentially fetching of instructions beyond the given address until a next branch is predicted to occur.

If a hit is detected in the BTB 42, then at step 304 the branch prediction circuitry 40 checks the predicted branch type 124 indicated by the hit BTB entry 120. If the predicted branch type is a non-polymorphic conditional branch (in this example, also functioning as the second branch type mentioned earlier), then at step 306 the branch prediction circuitry 40 predicts the target address of the branch based on the target address field 126 of the hit BTB entry 120. If the predicted branch type is a polymorphic conditional branch instruction, then at step 308 the target address of the branch if taken is predicted based on looking up the history-dependent target address predictor 43 using the given address and the history information 45 corresponding to recent program flow history related to outcomes of older instructions than the instruction at the given address. For example, the target address is predicted based on the address information stored in the one of the TAGE tables 150 of predictor 43 that detects a hit in the lookup and for which no other TAGE table 150 of predictor 43 that is looked up based on a longer sequence of history has also detected a hit. Regardless of whether the conditional branch is non-polymorphic or polymorphic, at step 310 the branch prediction circuitry predicts whether the branch should be taken or not taken based on a lookup the branch direction predictor 42 based on the given address and the history information tracked by the history information 45. At step 312, if the branch is predicted taken, then the branch prediction circuitry 40 speculatively updates the history information 45 based on the predicted outcome of the branch. For example, information dependent on the given address and/or the target address predicted for the branch may be pushed into the next entry of the branch history storage 45 (if the branch history storage 45 is already full, an oldest entry is overwritten or evicted to make way for the new entry). At step 314, the branch prediction circuitry 40 signals to the decode circuitry 10 that any predicated-loop (CPYM) micro-operations generated for the given address are to be accompanied with an indication that the second type of branch prediction (conditional branch prediction) was made for this instance of a predicated-loop (CPYM) instruction.

If at step 304, the predicted branch type was determined to be the predicated-loop (CPYM) branch type (first branch type), then at step 320 the branch prediction circuitry 40 determines whether a length misprediction hint 130 in the hit BTB entry 120 indicates that the history-dependent target address predictor 43 should be used to predict the length (predicted number of iterations) for the CPYM instruction at the given address. For example, the length misprediction hint 130 may be a flag or counter that tracks rate of mispredictions occurring based on the length prediction information hundred 28 stored in the BTB 42. The length misprediction hint 130 could for example be set in response to mispredictions of the length based on information 128, based on a similar chance-dependent test shown in FIG. 20, with the length misprediction hint 130 becoming set if the chance-dependent test evaluated when a misprediction of length based on length prediction information 128 provides the first outcome. Alternatively, the misprediction hint 130 could be a counter tracking mispredictions which, once the counter has reached a given threshold, indicates that future predictions of the CPYM length for the corresponding address should be made by predictor 43 depending on history information 45.

If the length misprediction hint 130 indicates that the history-dependent address prediction structure 43 does not need to be used, then at step 322 the length prediction information 128 of the hit BTB entry 120 is used to determine the predicted number of iterations. For example, the length prediction information 128 could specify the predicted number of iterations N directly or could specify information for deriving the predicted number of iterations from two or more values (e.g. confidence values associated with respective alternative predictions of N). At step 330 the branch prediction circuitry 40 omits any speculative update of the history information in history storage 45 based on the predicted number of iterations N. Hence, with the first branch prediction method the history information does not depend on how many iterations N have been predicted by the branch predictor 40 for the CPYM instruction. At step 332, the branch prediction circuitry 40 signals to the decode circuitry 10 that any predicated-loop (CPYM) micro-operations generated for the given address are to be accompanied with an indication that the first type of branch prediction (CPYM branch prediction) was made for this instance of a predicated-loop (CPYM) instruction.

On the other hand, if at step 320 the branch predictor 40 determines that the length misprediction hint 130 specifies that the history-dependent target address predictor 43 should be used, then at step 324 the branch predictor 40 looks up the history-dependent target address predictor 43 based on the given address and the history information from history storage 45. At step 326, length prediction information is selected from the one of the TAGE tables 150 of history-dependent target address predictor 43 which, among those TAGE tables 150 which detect a hit in the lookup, was looked up based on the longest sequence of history (i.e. the TAGE table 150 detecting a hit for which no other TAGE table looked up based on a longer sequence of history also detected a hit). At step 328 the length prediction information from the history-dependent target address predictor 43 is used to determine the predicted number of iterations N. The length prediction information in predictor 43 may have a similar format to the length prediction information 128 in BTB 42 and may be used to generate a prediction in a similar way to discussed for step 322. After generating the length prediction, steps 330 and 332 are performed in the same way as discussed above for cases when the length prediction information 128 in the BTB entry 120 is used to generate the length prediction for a CPYM branch.

While not explicitly shown in FIG. 20, if the predicted branch type is another type of branch other than the conditional branch or CPYM branch type, then this can be handled by a prediction mechanism specific to that type of branch.

FIG. 22 illustrates steps performed by the processing circuitry 4 (e.g. execute stage 16 and/or branch misprediction detection circuitry 46) and/or the branch predictor 40 when resolving the branch outcome for predicted branches. At step 350 the processing circuitry 4 resolves a branch outcome for a current branch micro-operation having a given address. At step 352 the micro-operation type for the current branch is determined. If the current branch is a conditional branch operation or a branch associated with a predicated-loop instruction (CPYM instruction) for which the accompanying prediction type indication (supplied based on the signal from the branch predictor at step 314) indicates that this micro-operation was generated based on the second type of branch prediction, then at step 354 the processing circuitry 4 determines whether the taken/not-taken branch direction outcome and the target address were correctly predicted for the current micro-operation. If both the branch direction and target address were correctly predicted, then at step 356 a signal is provided to the branch prediction circuitry 40 requesting an update to the branch prediction state 41 used to predict the outcome of the current branch micro-operation, to reinforce the correct prediction (e.g. a confidence value associated with the current prediction could be updated to indicate a more confident prediction). As the current micro-operation is one for which the second type of branch prediction was made, and so could be associated with a corresponding speculative update to history information at step 312, a previous speculative update of the history information for the given address is committed at step 358 (e.g. the commit pointer is updated to advance to the next entry of the history storage 45). If the branch outcome or the target address of the branch was determined at step 354 to be incorrectly predicted, then at step 360 the processing circuitry 4 triggers a flush of any incorrectly dispatched micro-operations from the processing pipeline. At step 362, the processing circuitry 4 signals to the branch prediction circuitry 40 to update its branch prediction state based on the actual branch direction outcome and/or target address of the branch. At step 364 any previous speculative updates of history information for the given address is reversed (for example, history information associated with the last committed point of program flow is restored, for instance by updating a speculative commit pointer associated with the history buffer 45 to a previous value). At step 366, fetching of program instructions resumes from the last committed point of program flow.

If at step 352 the type of branch micro-operation is determined to be a predicated-loop (CPYM) branch micro-operation for which the first type of branch prediction was made, then at step 372 the processing circuitry 4 or branch prediction circuitry 40 determines whether the predicted taken/not-taken outcome for the branch of the current CPYM micro-operation was good enough. The taken/not-taken outcome can be considered good enough if the predicted number of iterations N is in the range A to A+B, where A is the actual number of iterations and B is a margin within which over-predictions of the number of iterations can be tolerated without flushing. Evaluation of step 372 could be based on determining the actual number of iterations A explicitly based on operands of the CPYM instruction (e.g. the size operand and src, dst address operands mentioned in FIG. 3) and comparing the actual number of iterations A with the predicted number of iterations N, or alternatively by determining based on an indication of which iteration of the CPYM instruction is the current iteration whether the taken/not-taken outcome which would be predicted for the current iteration based on the predicted number of iterations N (i.e. taken for the first N−1 iterations and then not-taken on the Nth iteration) matches the actual taken/not-taken outcome evaluated based on operands specified for the corresponding CPYM micro-operation executed in the current iteration.

If the prediction of taken/not-taken outcome for the current CPYM micro-operation was good enough (e.g. N in the range A to A+B), then at step 374, the prediction made for this CPYM branch micro-operation is treated as if it was "correct" (not requiring a flush and worthy of reinforcement to favour similar predictions again in future). The processing circuitry 4 tolerates over-prediction scenarios where N>A, so does not need to flush the unnecessary N−A iterations in this case. At step 376, the processing circuitry 4 signals to the branch prediction circuitry to update the branch prediction state information 41 depending on the actual number of iterations A. For example, confidence in the prediction can be increased when a correct/good-enough prediction has been identified. At step 378, as the first type of branch prediction was made for this CPYM instance and as shown in FIG. 12 there is no speculative update of history information 45 for such a first type of branch prediction, there is no need for the processing circuitry 4 to perform an action to commit any speculative update of history information in response to resolution of the CPYM branch instruction.

If the predicted outcome for the current iteration was determined to not provide a good enough prediction at step 372 (the predicted number of iterations was either less than the actual number A, or greater than A+B), then at step 380 this is treated as a misprediction, so any incorrectly dispatched micro-operations are flushed from the pipeline (the flushed micro-operations could be micro-operations for unnecessary iterations of the CPYM instruction if N>A+B or could be micro-operations associated with subsequent instructions if N<A), and at step 382 the processing circuitry 4 signals to the branch predictor 40 to update its branch prediction state information 41 (e.g. length prediction information in its predictors 42, 43) based on the actual number of iterations A. If the prediction of the number of iterations N was based on length prediction information 128 stored in the BTB 42, then the length misprediction hint counter 130 may be updated (e.g. a counter is incremented or a flag is set based on a probabilistic approach using the chance-dependent test similar to FIG. 20).

At step 384, the branch prediction circuitry 40 determines whether the misprediction of the number of iterations was based on length prediction information stored in the longest-history table T4 of the history-dependent target address predictor 43 (the one of the TAGE tables 150 that is looked up with the longest sequence of program flow history information from the history storage 45). If so, then at step 392 the branch predictor 40 determines whether the branch type update condition is satisfied. This could be by performing the chance-dependent test as in FIG. 20, or by incrementing a misprediction counter associated with the given address (e.g. stored in the longest-history table T4 of the predictor 43 or in the BTB entry 120 corresponding to the given address) and determining that the misprediction counter has reached a given threshold value or has overflowed. In some cases, if a counter is used to track mispredictions, the increment of the counter could itself by applied selectively based on applying a chance-dependent test similar to that of FIG. 20. If the branch type update condition is satisfied, then at step 394 the type field 124 in the BTB entry 42 associated with the given address is updated to switch the predicted branch type from the first branch type (CPYM) to the second branch type (conditional branch instruction), and the branch predictor 40 sets the predicted branch target address field 126 of that BTB entry to indicate the given address itself. Step 394 is omitted if the branch type update condition is determined not to be satisfied. Either way, at step 386 fetching resumes from the last committed point of program flow and at step 388 there is no need for any reversal of speculative updates to the history storage 45 made for the CPYM instruction (as there would not have been any such speculative updates as explained at step 330 of FIG. 21).

If at step 384 the misprediction was determined not to be based on length prediction information stored in the longest-history table T4 of the history-dependent target address predictor 43, then steps 392, 394 are omitted and the method proceeds straight to step 386 to resume fetching.

Again, FIG. 22 does not necessarily show all branch types that are supported. If another type of branch is detected at step 352, branch resolution for that type of branch can be handled in a different way to the CPYM and conditional branches shown in FIG. 22.

Figure 23:
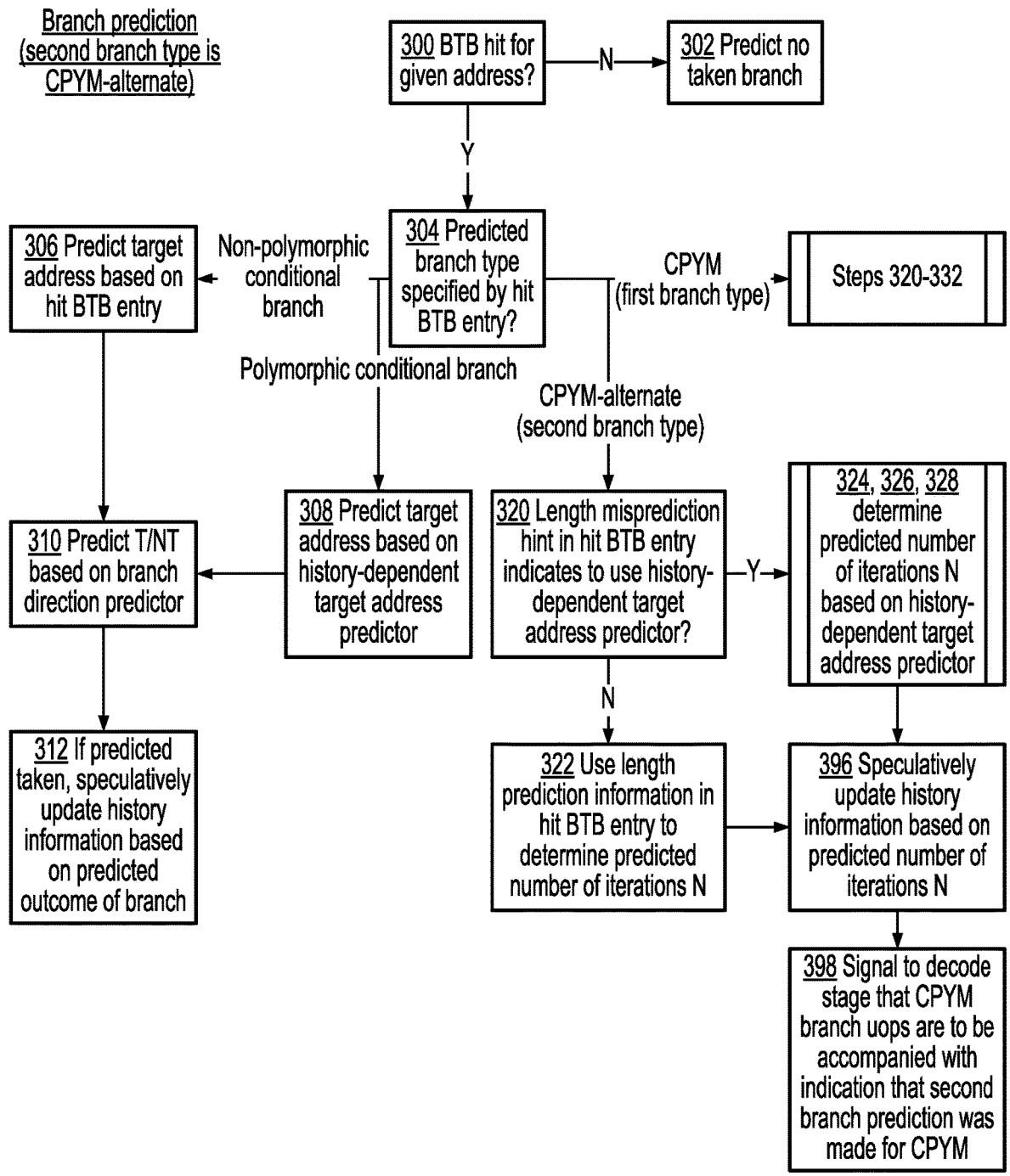
FIG. 23 illustrates steps for generating branch predictions for a second example where the second branch type is an alternate type of predicated-loop instruction.
Figure 24:
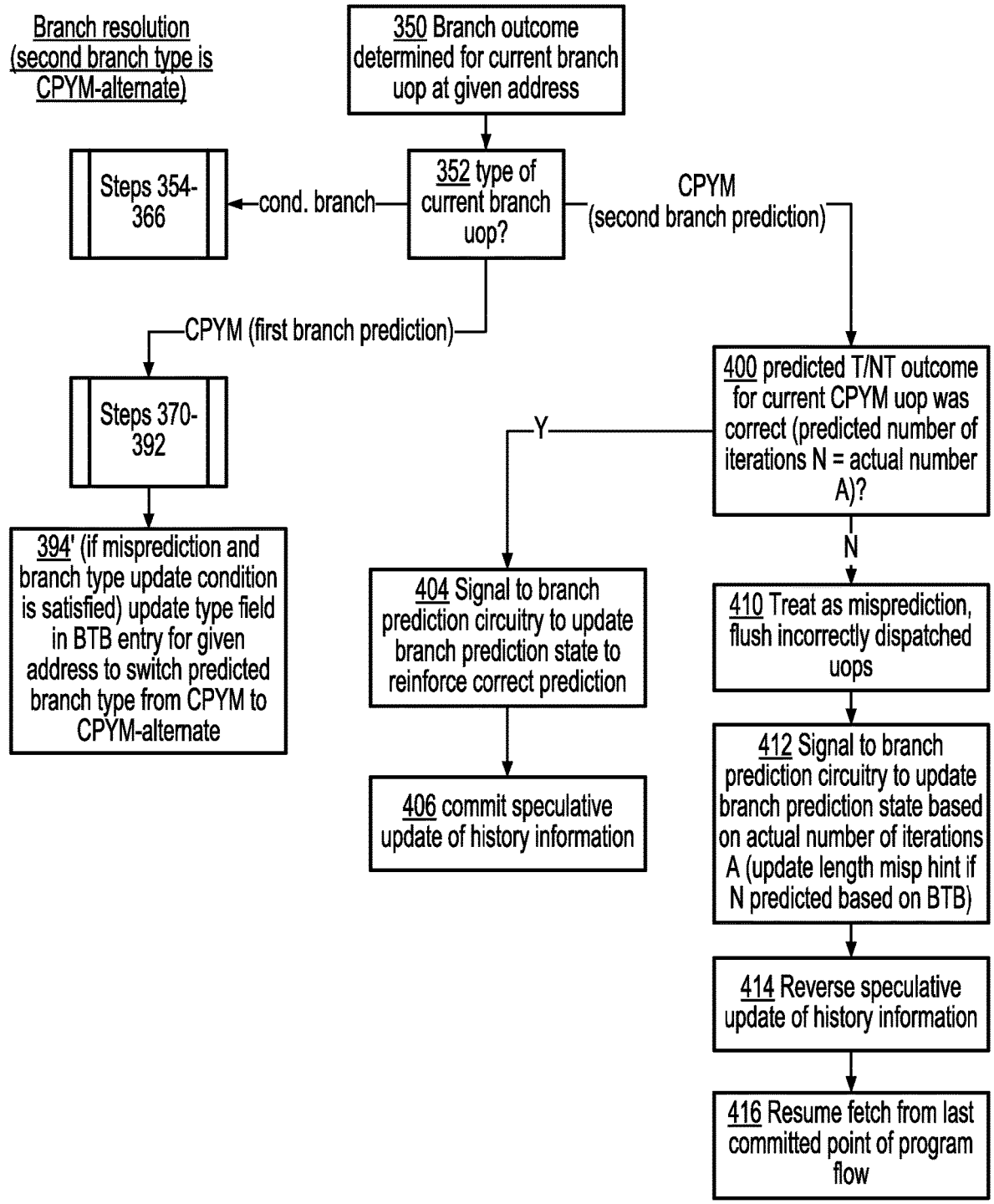
FIG. 24 illustrates steps for updating prediction state based on branch resolution for the second example.

FIGS. 23 and 24 show another example based on the second branch type being a CPYM-alternate branch type. FIG. 23 illustrates branch prediction by branch prediction circuitry 40 for this example. Steps 300, 302, 304 are the same as in FIG. 20. If the predicted branch type for the given address is the first branch type (CPYM branch) then steps 320-322 are performed as in FIG. 21. If the predicted branch type is a conditional branch, steps 306, 308, 310, 312 are the same as in FIG. 21, but there is no need for step 314 in FIG. 23 because in this example it is not possible for CPYM instructions to be predicted as conditional branches.

If at step 304 the predicted branch is the alternate type of predicated-loop instruction (CPYM-alternate, or second branch type), then steps 320, 322, 324, 326, 328 are the same as shown for the first branch type in FIG. 21, but in this case step 330 is replaced with step 396 so that a speculative update of the history information 45 is made based on the predicted number of iterations N determined for the CPYM instruction at the given address (e.g. a value representing the predicted number of iterations N is padded (if necessary) to match the number of bits used for the values pushed into history information 45 for conditional branches, and inserted into the next entry of the history information). At step 398 a signal is provided to the decode stage 10 indicating that any CPYM branch micro-operations corresponding to the given address are to be accompanied with an indication that the second type of branch prediction (CPYM-alternate) was made for that CPYM instruction.

FIG. 24 illustrates the branch resolution processing by processing circuitry 4 for the second example based on the second branch type being the CPYM-alternate branch type. Steps 350, 352 are the same as in FIG. 22. If the resolved branch is a conditional branch, then steps 354 to 366 are the same as in FIG. 22. If the resolved branch is the CPYM branch for which the branch prediction type signal passed to the execute stage 16 with the CPYM micro-operations indicates that the first type of branch prediction was made by the branch predictor 40, then steps 370 to 392 are the same as in FIG. 22, but step 394 is replaced with step 394' so that, upon a misprediction for which the branch type update condition is satisfied, rather than updating the branch type to a conditional branch type, the branch type field 124 for the BTB entry associated with the given address is updated to indicate the CPYM-alternate branch type.

If at step 352 the current resolved branch micro-operation is determined to be a CPYM branch for which the second type of branch prediction was made by the branch predictor 40 (as indicated by the accompanying branch prediction type signal passed by the decode stage 10), then at step 400, the processing circuitry 4 determines whether the predicted taken/not-taken outcome for the current CPYM micro-operation was correct (the outcome will be correct if the predicted number of iterations N equals the actual number of iterations A). Again this could be determined by actually evaluating the actual number of iterations A, or by treating the CPYM operation iteration by iteration and so determining whether the taken/not-taken iteration for the current iteration is consistent with the predicted number of iterations N. At step 400, there is no concept of an incorrect but "good enough" prediction—any incorrect T/NT prediction will be treated as a misprediction.

If the prediction associated with the current CPYM micro-operation was correct, then no flush is required and at step 404 the branch prediction circuitry is signalled to update its branch prediction state 41 to reinforce the correct prediction, and at step 406 the speculative update of history information made in response to the CPYM-alternate branch prediction at step 396 of FIG. 23 is committed.

If the prediction made in respect of the current CPYM micro-operation was incorrect, then at step 410 this is treated as a misprediction and any incorrectly dispatched micro-operations are flushed from the processing pipeline. Hence, this approach does not tolerate processing of unnecessary loop iterations in cases when the predicted number N is greater than the actual number A. At step 412 the branch prediction circuitry is signalled to update its branch prediction state 41 based on the actual number of iterations, e.g. updating the length misprediction information 128 or length information in a corresponding entry of the history-dependent address predictor 43, and/or updating the length misprediction hint 130. At step 414, the previous speculative update of history information 45 performed in response to the CPYM-alternate branch prediction is reversed (e.g. by restoring a previous value of the speculative insert pointer associated with history storage 45). At step 416, fetching of instructions resumes from the address associated with the last committed point of program flow.

It will be appreciated that the flow charts discussed in this application show one possible sequence of steps, but other examples may reorder steps or perform steps at least partially in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 25:
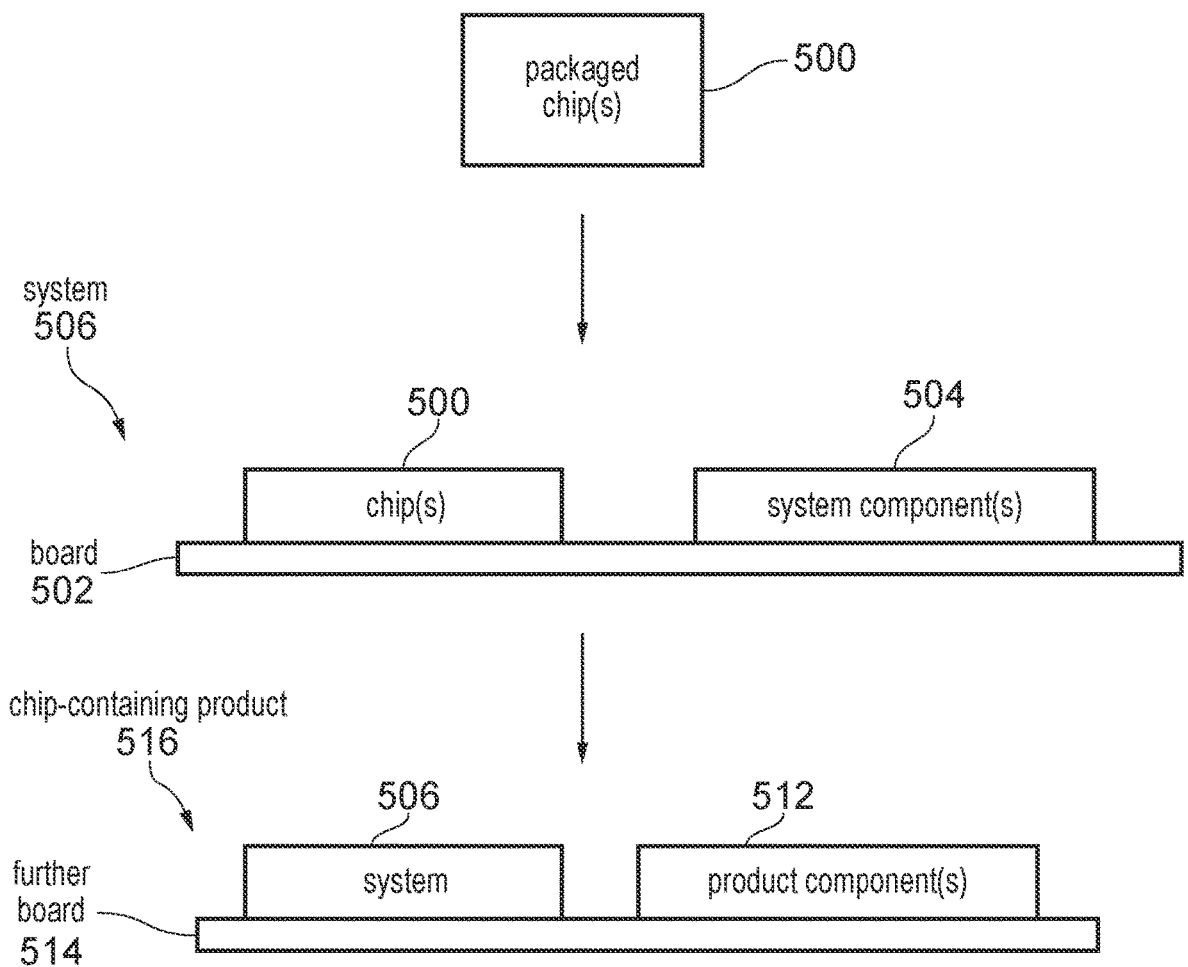
FIG. 25 illustrates a system and a chip-containing product.

As shown in FIG. 25, one or more packaged chips 500, with the apparatus described above implemented on one chip or distributed over two or more of the chips, are manufactured by a semiconductor chip manufacturer. In some examples, the chip product 500 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 500 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 500 are assembled on a board 502 together with at least one system component 504 to provide a system 506. For example, the board may comprise a printed circuit board. The board substrate may be made of any of a variety of materials, e.g. plastic, glass, ceramic, or a flexible substrate material such as paper, plastic or textile material. The at least one system component 504 comprise one or more external components which are not part of the one or more packaged chip(s) 500. For example, the at least one system component 504 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 516 is manufactured comprising the system 506 (including the board 502, the one or more chips 500 and the at least one system component 504) and one or more product components 512. The product components 512 comprise one or more further components which are not part of the system 506. As a non-exhaustive list of examples, the one or more product components 512 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 506 and one or more product components 512 may be assembled on to a further board 514.

The board 502 or the further board 514 may be provided on or within a device housing or other structural support (e.g. a frame or blade) to provide a product which can be handled by a user and/or is intended for operational use by a person or company.

The system 506 or the chip-containing product 516 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:
1. An apparatus comprising:
   processing circuitry to perform processing operations;
   branch prediction circuitry to determine a branch prediction associated with a given address, the branch prediction depending on a predicted branch type associated with the given address; and
   history storage circuitry to store history information indicative of a history of program flow;
   in which:
   in response to determining that the predicted branch type for the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;

in response to determining that the predicted branch type for the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction;

the branch prediction circuitry is configured to determine, following detection of a misprediction of the predicted number of iterations indicated by the first type of branch prediction for the given address, whether a branch type update condition is satisfied, and in response to detecting that the misprediction condition is satisfied, switch the predicted branch type associated with the given address from the first branch type to the second branch type.

2. The apparatus according to clause 1, in which for the second type of branch prediction, the processing circuitry is unable to tolerate incorrect prediction of an outcome of an instruction corresponding to the given address.

3. The apparatus according to any of clauses 1 and 2, in which in response to resolution of the second type of branch prediction, the processing circuitry is configured to commit or reverse a speculative update of the history information made based on the predicted outcome predicted by the second type of branch prediction.

4. The apparatus according to any of clauses 1 to 3, in which the processing circuitry is configured to determine, based on branch prediction type information associated with a predicated-loop micro-operation decoded from the predicated-loop instruction at the given address, whether the branch prediction circuitry generated the first type of branch prediction or the second type of branch prediction for the predicated-loop instruction, and to select between a first branch prediction resolution mechanism and a second branch prediction resolution mechanism depending on the branch prediction type information.

5. The apparatus according to any of clauses 1 to 4, in which the branch prediction circuitry is configured to determine that the branch type update condition is satisfied in response to determining that a chance-dependent test, evaluated in response to detection of the misprediction of the predicted number of iterations indicated by the first type of branch prediction for the given address, provides a first outcome, where the chance-dependent test has a given probability of providing the first outcome.

6. The apparatus according to any of clauses 1 to 5, in which the branch prediction circuitry is configured to determine that the branch type update condition is satisfied in response to detecting that a misprediction counter for the given address has reached or exceeded a threshold value.

7. The apparatus according to any of clauses 1 to 6, in which the branch prediction circuitry is configured to generate the first type of branch prediction depending on a lookup of a history-dependent data structure based on the given address and the history information, the history-dependent data structure comprising a plurality of tables of branch prediction state looked up based on different lengths of history information from the history storage circuitry; and in response to detecting misprediction of the predicted number of iterations indicated by the first type of branch prediction when the first type of branch prediction was made based on an entry in a longest-history table of branch prediction state that, among the plurality of tables, is looked up based on a longest sequence of history information from the history storage circuitry, the branch prediction circuitry is configured to determine whether the branch type update condition is satisfied, and in response to determining that the branch type update condition is satisfied, switch the predicted branch type associated with the given address from the first branch type to the second branch type.

8. The apparatus according to any of clauses 1 to 7, in which, in response to an indication that a branch to a given branch target address has been taken by the processing circuitry in response to a conditional branch instruction detected as corresponding to the given address, the branch prediction circuitry is configured to set the predicted branch type associated with the given address to be the second branch type.

9. The apparatus according to any of clauses 1 to 8, in which the second type of branch prediction indicates:
branch outcome information indicative of whether a taken branch is predicted to occur at the given address, and
at least when the branch is to be taken, a predicted branch target address selected based on branch target address prediction information associated with the given address.

10. The apparatus according to clause 9, in which, when setting the predicted branch type for the given address to the second branch type in response to the branch type update condition being determined to be satisfied, the branch prediction circuitry is configured to set the branch target address prediction information corresponding to the given address to indicate the given address itself.

11. The apparatus according to any of clauses 1 to 10, in which, in response to a predicated-loop instruction detection signal indicating that an instruction fetched for the given address has been decoded as being the predicated-loop instruction, the branch prediction circuitry is configured to trigger a branch type update to set the predicted branch type associated with the given address to be the first branch type.

12. The apparatus according to clause 11, in which the branch prediction circuitry is configured to suppress the branch type update from being performed for the given address in response to the predicated-loop instruction detection signal, in response to a detection that the predicted branch type for the given address is currently the second branch type and branch target address prediction information corresponding to the given address indicates the given address itself.

13. The apparatus according to any of clauses 1 to 7, in which the second type of branch prediction indicates the predicted number of iterations for the predicated-loop instruction, and for a predicated-loop instruction for which the second type of branch prediction is generated by the branch prediction circuitry, the processing circuitry is unable to tolerate at least one unnecessary iteration of the predicated loop body being processed when the predicted number of iterations is greater than an actual number of iterations required for the predicated-loop instruction.

14. The apparatus according to clause 13, in which in response to determining that the predicted branch type for the given address is the second branch type, the branch prediction circuitry is configured to speculatively update the history information based on the predicted number of iterations indicated by the second type of branch prediction.

15. The apparatus according to any of clauses 13 and 14, in which in response to resolution of the second type of branch prediction for a predicated-loop instruction, the processing circuitry is configured to commit or reverse the speculative update of the history information made based on the second type of branch prediction depending on whether the predicted number of iterations indicated by the second type of branch prediction equals the actual number of iterations required for the predicated-loop instruction at the given address.

16. The apparatus according to any of clauses 1 to 15, in which, for a predicated-loop instruction for which the first type of branch prediction is generated by the branch prediction circuitry, the branch prediction circuitry is configured to:
   treat the first type of branch prediction as a correct prediction when the predicted number of iterations lies in a range A to A+B, where A is the actual number of iterations and B is an integer greater than or equal to 1; and
   treat the first type of branch prediction as a misprediction when the predicted number of iterations lies outside the range A to A+B.

17. The apparatus according to any of clauses 1 to 16, in which the predicated loop body comprises a set of operations to:
   determine a variable number of bytes to be processed in a current iteration;
   perform at least one processing operation based on the variable number of bytes determined for the current iteration, the at least one processing operation including at least one of a load operation and a store operation; and
   update, based on the variable number of bytes, a remaining bytes parameter indicative of a remaining number of bytes to be processed.

18. A system comprising:
   the apparatus according to any of clauses 1 to 17, implemented in at least one packaged chip;
   at least one system component; and
   a board,
   wherein the at least one packaged chip and the at least one system component are assembled on the board.

19. A chip-containing product comprising the system of clause 18, wherein the system is assembled on a further board with at least one other product component.

20. Computer-readable code for fabrication of an apparatus comprising:
   processing circuitry to perform processing operations;
   branch prediction circuitry to determine a branch prediction associated with a given address, the branch prediction depending on a predicted branch type associated with the given address; and
   history storage circuitry to store history information indicative of a history of program flow;
   in which:
   in response to determining that the predicted branch type for the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;
   in response to determining that the predicted branch type for the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction;
   the branch prediction circuitry is configured to determine, following detection of a misprediction of the predicted number of iterations indicated by the first type of branch prediction for the given address, whether a branch type update condition is satisfied, and in response to detecting that the misprediction condition is satisfied, switch the predicted branch type associated with the given address from the first branch type to the second branch type.

21. A method for branch prediction, comprising:
   storing history information indicative of a history of program flow;
   in response to determining that a predicted branch type for a given address is a first branch type corresponding to a predicated-loop instruction for triggering processing circuitry to perform a variable number of iterations of a predicated loop body, branch prediction circuitry generating a first type of branch prediction indicative of a predicted number of iterations for the predicated-loop instruction, and omitting speculatively updating history information based on the predicted number of iterations indicated by the first type of branch prediction, the branch prediction circuitry being capable of selecting the predicted number of iterations depending on the history information stored in the history storage circuitry, and the predicated-loop instruction being an instruction for which the processing circuitry is able to tolerate at least one unnecessary iteration of the predicated loop body being processed when the predicted number of iterations is greater than an actual number of iterations required for the predicated-loop instruction;

in response to determining that the predicted branch type for the given address is a second branch type, the branch prediction circuitry generating a second type of branch prediction and, at least in response to a determination that the second type of branch prediction indicates that at least one branch corresponding to the given address is predicted to be taken, speculatively updating the history information based on a predicted outcome predicted by the second type of branch prediction; and following detection of a misprediction of the predicted number of iterations indicated by the first type of branch prediction for the given address, determining whether a branch type update condition is satisfied, and in response to detecting that the misprediction condition is satisfied, switching the predicted branch type associated with the given address from the first branch type to the second branch type.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry, implemented using hardware, to perform processing operations;

branch prediction circuitry to determine a branch prediction associated with a given address, the branch prediction depending on a predicted branch type associated with the given address; and history storage circuitry to store history information indicative of a history of program flow;

in which:

in response to determining that the predicted branch type associated with the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being configured to support selecting the predicted number of iterations depending on the history information stored in the history storage circuitry, and the predicated-loop instruction being an instruction for which the processing circuitry is able to tolerate, by suppressing flushing, at least one unnecessary iteration of the predicated loop body being processed when the predicted number of iterations is greater than an actual number of iterations required for the predicated-loop instruction;

in response to determining that the predicted branch type associated with the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction; and the branch prediction circuitry is configured to determine, following detection of a misprediction of the predicted number of iterations indicated by the first type of branch prediction for the given address, whether a branch type update condition is satisfied, and in response to detecting that the branch type update condition is satisfied, switch the predicted branch type associated with the given address from the first branch type to the second branch type.

2. The apparatus according to claim 1, in which for the second type of branch prediction, the processing circuitry is unable to tolerate incorrect prediction of an outcome of an instruction corresponding to the given address.

3. The apparatus according to claim 1, in which in response to resolution of the second type of branch prediction, the processing circuitry is configured to commit or reverse a speculative update of the history information made based on the predicted outcome predicted by the second type of branch prediction.

4. The apparatus according to claim 1, in which the processing circuitry is configured to determine, based on branch prediction type information associated with a predicated-loop micro-operation decoded from the predicated-loop instruction at the given address, whether the branch prediction circuitry generated the first type of branch prediction or the second type of branch prediction for the predicated-loop instruction, and to select between a first branch prediction resolution mechanism and a second branch prediction resolution mechanism depending on the branch prediction type information.

5. The apparatus according to claim 1, in which the branch prediction circuitry is configured to determine that the branch type update condition is satisfied in response to determining that a chance-dependent test, evaluated in response to detection of the misprediction of the predicted number of iterations indicated by the first type of branch prediction for the given address, provides a first outcome, where the chance-dependent test has a given probability of providing the first outcome.

6. The apparatus according to claim 1, in which the branch prediction circuitry is configured to determine that the branch type update condition is satisfied in response to detecting that a misprediction counter for the given address has reached or exceeded a threshold value.

7. The apparatus according to claim 1, in which the branch prediction circuitry is configured to generate the first type of branch prediction depending on a lookup of a history-dependent data structure based on the given address and the history information, the history-dependent data structure comprising a plurality of tables of branch prediction state looked up based on different lengths of history information from the history storage circuitry; and in response to detecting misprediction of the predicted number of iterations indicated by the first type of branch prediction when the first type of branch prediction was made based on an entry in a longest-history table of branch prediction state that, among the plurality of tables, is looked up based on a longest sequence of history information from the history storage circuitry, the branch prediction circuitry is configured to determine whether the branch type update condition is satisfied, and in response to determining that the branch type update condition is satisfied, switch the predicted branch type associated with the given address from the first branch type to the second branch type.

8. The apparatus according to claim 1, in which, in response to an indication that a branch to a given branch target address has been taken by the processing circuitry in response to a conditional branch instruction detected as corresponding to the given address, the branch prediction circuitry is configured to set the predicted branch type associated with the given address to be the second branch type.

9. The apparatus according to claim 1, in which the second type of branch prediction indicates:

branch outcome information indicative of whether a taken branch is predicted to occur at the given address, and at least when the taken branch is predicted to occur, a predicted branch target address selected based on branch target address prediction information associated with the given address; and when setting the predicted branch type associated with the given address to the second branch type in response to the branch type update condition being determined to be satisfied, the branch prediction circuitry is configured to set the branch target address prediction information associated with the given address to indicate the given address itself.

10. The apparatus according to claim 1, in which, in response to a predicated-loop instruction detection signal indicating that an instruction fetched for the given address has been decoded as being the predicated-loop instruction, the branch prediction circuitry is configured to trigger a branch type update to set the predicted branch type associated with the given address to be the first branch type.

11. The apparatus according to claim 10, in which the branch prediction circuitry is configured to suppress the branch type update from being performed for the given address in response to the predicated-loop instruction detection signal, in response to a detection that the predicted branch type associated with the given address is currently the second branch type and branch target address prediction information corresponding to the given address indicates the given address itself.

12. The apparatus according to claim 1, in which the second type of branch prediction indicates the predicted number of iterations for the predicated-loop instruction, and for a predicated-loop instruction for which the second type of branch prediction is generated by the branch prediction circuitry, the processing circuitry is unable to tolerate at least one unnecessary iteration of the predicated loop body being processed when the predicted number of iterations is greater than an actual number of iterations required for the predicated-loop instruction.

13. The apparatus according to claim 12, in which in response to determining that the predicted branch type associated with the given address is the second branch type, the branch prediction circuitry is configured to speculatively update the history information based on the predicted number of iterations indicated by the second type of branch prediction.

14. The apparatus according to claim 12, in which in response to resolution of the second type of branch prediction for the predicated-loop instruction, the processing circuitry is configured to commit or reverse the speculative update of the history information made based on the second type of branch prediction depending on whether the predicted number of iterations indicated by the second type of branch prediction equals the actual number of iterations required for the predicated-loop instruction at the given address.

15. The apparatus according to claim 1, in which, for a predicated-loop instruction for which the first type of branch prediction is generated by the branch prediction circuitry, the branch prediction circuitry is configured to:

treat the first type of branch prediction as a correct prediction when the predicted number of iterations lies in a range A to A+B, where A is the actual number of iterations and B is an integer greater than or equal to 1; and treat the first type of branch prediction as a misprediction when the predicted number of iterations lies outside the range A to A+B.

16. The apparatus according to claim 1, in which the predicated loop body comprises a set of operations to:

determine a variable number of bytes to be processed in a current iteration;

perform at least one processing operation based on the variable number of bytes determined for the current iteration, the at least one processing operation including at least one of a load operation and a store operation; and update, based on the variable number of bytes, a remaining bytes parameter indicative of a remaining number of bytes to be processed.

17. A system comprising:

the apparatus according to claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A non-transitory computer-readable medium storing computer-readable code for fabrication of an apparatus comprising:

processing circuitry, implemented using hardware, to perform processing operations;

branch prediction circuitry to determine a branch prediction associated with a given address, the branch prediction depending on a predicted branch type associated with the given address; and history storage circuitry to store history information indicative of a history of program flow;

in which:

in response to determining that the predicted branch type associated with the given address is a first branch type corresponding to a predicated-loop instruction for triggering the processing circuitry to perform a variable number of iterations of a predicated loop body, the branch prediction circuitry is configured to generate a first type of branch prediction indicative of a predicted number of iterations for the predicated-loop instruction, and omit speculatively updating the history information based on the predicted number of iterations indicated by the first type of branch prediction, the branch prediction circuitry being configured to support selecting the predicted number of iterations depending on the history information stored in the history storage circuitry, and the predicated-loop instruction being an instruction for which the processing circuitry is able to tolerate, by suppressing flushing, at least one unnecessary iteration of the predicated loop body being processed when the predicted number of iterations is greater than an actual number of iterations required for the predicated-loop instruction;

in response to determining that the predicted branch type associated with the given address is a second branch type, the branch prediction circuitry is configured to generate a second type of branch prediction and, at least when the second type of branch prediction indicates that at least one branch corresponding to the given address is predicted to be taken, speculatively update the history information based on a predicted outcome predicted by the second type of branch prediction;

the branch prediction circuitry is configured to determine, following detection of a misprediction of the predicted number of iterations indicated by the first type of branch prediction for the given address, whether a branch type update condition is satisfied, and in response to detecting that the branch type update condition is satisfied, switch the predicted branch type associated with the given address from the first branch type to the second branch type.

20. A method for branch prediction, comprising:

storing history information indicative of a history of program flow;

in response to determining that a predicted branch type associated with a given address is a first branch type corresponding to a predicated-loop instruction for triggering processing circuitry to perform a variable number of iterations of a predicated loop body, branch prediction circuitry generating a first type of branch prediction indicative of a predicted number of iterations for the predicated-loop instruction, and omitting speculatively updating the history information based on the predicted number of iterations indicated by the first type of branch prediction, the branch prediction circuitry being configured to support selecting the predicted number of iterations depending on the history information, and the predicated-loop instruction being an instruction for which the processing circuitry is able to tolerate, by suppressing flushing, at least one unnecessary iteration of the predicated loop body being processed when the predicted number of iterations is greater than an actual number of iterations required for the predicated-loop instruction;

in response to determining that the predicted branch type associated with the given address is a second branch type, the branch prediction circuitry generating a second type of branch prediction and, at least in response to a determination that the second type of branch prediction indicates that at least one branch corresponding to the given address is predicted to be taken, speculatively updating the history information based on a predicted outcome predicted by the second type of branch prediction; and following detection of a misprediction of the predicted number of iterations indicated by the first type of branch prediction for the given address, determining whether a branch type update condition is satisfied, and in response to detecting that the branch type update condition is satisfied, switching the predicted branch type associated with the given address from the first branch type to the second branch type.

* * * * *